United States Patent [19]
Juniper et al.

[11] Patent Number: 6,021,117
[45] Date of Patent: Feb. 1, 2000

[54] SYSTEM FOR PARAMETER ANALYSIS AND TRAFFIC MONITORING IN ASYNCHRONOUS TRANSFER MODE (ATM) NETWORKS

[75] Inventors: Andrew Juniper, Surrey; David Quentin Howard, London, both of United Kingdom; Yaron Dyclan, Tel Aviv; Meir Kruk, Ramat Gan, both of Israel

[73] Assignee: Madge Networks (Israel) Ltd., Tel Aviv, Israel

[21] Appl. No.: 08/810,194

[22] Filed: Mar. 3, 1997

[30]    Foreign Application Priority Data

Mar. 4, 1996 [IL] Israel ......................................... 117366

[51] Int. Cl.$^7$ ................................................... H04L 12/26
[52] U.S. Cl. ........................................... 370/252; 370/395
[58] Field of Search ..................................... 370/241, 248, 370/250, 252, 253, 395, 396, 400, 905, 230, 235; 379/1, 21; 340/825.06

[56]    References Cited

U.S. PATENT DOCUMENTS

| | | | |
|---|---|---|---|
| 5,253,247 | 10/1993 | Hirose et al. ............................ | 370/232 |
| 5,524,106 | 6/1996 | Tremel et al. ........................... | 370/253 |
| 5,530,695 | 6/1996 | Dighe et al. .............................. | 370/17 |
| 5,636,345 | 6/1997 | Valdevit ............................. | 395/200.11 |
| 5,638,371 | 6/1997 | Raychaudhuri et al. ............... | 370/347 |
| 5,661,722 | 8/1997 | Miyagi .................................... | 370/252 |
| 5,751,698 | 5/1998 | Cushman et al. ....................... | 370/252 |
| 5,764,626 | 6/1998 | VanDervort ............................. | 370/232 |

OTHER PUBLICATIONS

RMON MIB, RFC 1757, IETF Standard, Ed. S. Waldbusser, Carnegie Mellon University, Publication Date: Feb. 1995, WWW Internet Site http://ftp.internic.net., pp. 1–91.

Token Ring Extensions to RMON MIB, RFC 1513, Ed. S. Waldbusser, Carnegie Mellon University, Publication Date: Sep. 1993, WWW Internet Site http://ftp/internic.net., pp. 1–55.

The AToM MIB, RFC 1695, IETF Standard, Eds. M. Ahmed & K. Tesnik, Bell Communications Research, Publication Date: Aug. 1994, WWW Internet Site http://ftp.internic.net., pp. 1–73.

CISCO Collaborates with RMON & Analysis Tool Vendors to Develop Specification for ATM Remote Monitoring, Cisco News, Feb. 20, 1996.

LAN Emulation Over ATM Specification—Version 1.0, Ed. Bill Ellington, IBM Published by the ATM Forum, Publication Date: not available, pp. 1–139.

User Network Interface (UNI)3.1, Published by the ATM Forum, Sep. 1994.

Proposal for Remote Network Monitoring MIB Extensions for ATM Networks, Andy Bierman, et al., Published by the ATM Forum, Sep. 23, 1996, pp. 1–72.

*Primary Examiner*—Chi H. Pham
*Assistant Examiner*—Ricky Q. Ngo

[57]    ABSTRACT

This invention discloses a method and apparatus for analyzing traffic on an ATM network, the network comprising a first plurality of stations to be interconnected by a second plurality of ATM connections, the method includes intercepting at least one ATM connection characteristic of each of the second plurality of ATM connections and storing the at least one ATM connection characteristic in an ATM connection characteristic memory, monitoring the amount of traffic passing over each of the second plurality of ATM connections and accumulating the amounts of traffic in the ATM connection characteristic memory; for at least one ATM connection subset including at least one of the second plurality of ATM connections which complies with a retrieval key, the retrieval key comprising a combination of at least one of the ATM connection characteristics, determining the total amount of traffic that has passed over the ATM connection subset by retrieving from the memory, using the retrieval key, the amounts of traffic passing over each ATM connection in the ATOM connection subset and summing the amounts and generating an output representation of the total amount of traffic.

31 Claims, 7 Drawing Sheets

SYSTEM FOR PARAMETER ANALYSIS AND TRAFFIC MONITORING IN ASYNCHRONOUS TRANSFER MODE (ATM) NETWORKS

FIELD OF THE INVENTION

The present invention relates to networks in general, and specifically to operational parameter analysis and traffic monitoring in asynchronous transfer mode (ATM) networks.

BACKGROUND OF THE INVENTION

Various types of networks are well-known in the art. Common network types include Ethernet, token ring, and asynchronous transfer mode (ATM) networks. In each of these types of networks, it is desirable to analyze network operational parameters, such as network traffic and network errors, for planning, fault detection, and other purposes. Apparatus and methods for network operational analysis are well-known for Ethernet networks and are described, for example, in RMON MIB, RFC 1757, IETF standard, Ed. S. Waldbusser, Carnegie Mellon University, publication date February 1995, available, for example, from WWW Internet site http://ftp.internic.net. Traffic analysis apparatus and methods for token ring networks are also well-known and are described, for example, in Token Ring Extensions to RMON MIB, RFC 1513, Ed. S. Waldbusser, Carnegie Mellon University, publication date September 1993, available, for example, from WWW Internet site http://ftp.internic.net.

For ATM networks, suggestions have been made for traffic analysis such as, for example, the VC Steering MIB, a contribution to the ATM Forum. The VC Steering MIB suggests a method where a specific connection is copied to a monitoring device; that is, where all traffic passing over a specific connection is also sent to the monitoring device. Copying a specific connection to a monitoring device is believed to not be optimum in all cases because, for example, in the case where a large amount of traffic passes over the connection, the amount of traffic to be copied is large and hence a significant load may be placed on the ATM network by the copying itself.

The AToM MIB, RFC 1695, IETF standard, Ed. M. Ahmed and K. Tesnik, Bell Communications Research, publication date August 1994, available, for example, from WWW Internet site http://ftp.intenic.net, suggests a method for traffic monitoring in ATM networks where monitoring is performed on the individual circuit level. No suggestion is made in the AToM MIB to group together monitoring information from different circuits.

A press release entitled "Cisco Collaborates with RMON and Analysis Tool Vendors to Develop Specification for ATM Remote Monitoring", dated Feb. 20, 1996, describes an intention to present a draft specification for ATM traffic analysis to the Internet Engineering Task Force (IETF).

A proposal entitled "Proposal for Remote Network Monitoring MIB Extensions for ATM Networks" was distributed at the ATMF's "Test Sub-Working Group" and "Network Managing Sub-Working Group" meeting on Sep. 23, 1996. The proposal number is ATM_Forum/96-0808R1.

Methods and apparatus used in ATM networking are described in the following sample list of publications:

User Network Interface (UNI) 3.1, published by the ATM Forum, September 1994; and Specification for LAN Emulation over ATM—Version 1.0, Ed. Bill Ellington, IBM, published by the ATM Forum, publication date not available, particularly page 44.

The SNMP protocol is described in The Simple Book—An Introduction to Management of TCP/IP based Internets, Marshall T. Rose, published by Prentice Hall, N.J., USA, 1991.

Further publications may be accessed via the ATM Forum whose Internet address is: http://www.atmforum.com.

The disclosures of the above publications and of the publications cited therein are hereby incorporated by reference. The disclosures of all publications mentioned in this specification and of the publications cited therein are hereby incorporated by reference.

SUMMARY OF THE INVENTION

The present invention seeks to provide an improved system for analyzing operational parameters on an ATM network. Operational parameters typically include network traffic and network errors, and may also include any other suitable operational parameters of the ATM network. The present invention is intended to overcome known problems of prior art systems and of previous suggestions for analyzing ATM operational parameters, such as the problems described above in the method suggested by the VC Steering MIB.

There is thus provided in accordance with a preferred embodiment of the present invention a method for analyzing traffic on an ATM network, the network including a first plurality of stations to be interconnected by a second plurality of ATM connections, the method including intercepting at least one ATM connection characteristic of preferably each of the second plurality of ATM connections and storing the at least one ATM connection characteristic in an ATM connection characteristic memory, monitoring the amount of traffic passing over each of the second plurality of ATM connections and accumulating the amounts of traffic in the ATM connection characteristic memory, for at least one ATM connection subset including at least two of the second plurality of ATM connections which complies with a retrieval key, the retrieval key including a combination of at least one of the ATM connection characteristics, determining the total amount of traffic that has passed over the ATM connection subset by retrieving from the memory, using the retrieval key, the amounts of traffic passing over each ATM connection in the ATM connection subset and summing the amounts, and generating an output representation of the total amount of traffic.

Further in accordance with a preferred embodiment of the present invention the at least one ATM connection characteristic includes the identity of at least one of the stations interconnected by an individual ATM connection.

Still further in accordance with a preferred embodiment of the present invention at least one of the ATM connections includes a LAN-emulation ATM connection and the at least one ATM connection characteristic includes a LAN-emulation protocol ID.

Additionally in accordance with a preferred embodiment of the present invention the at least one ATM connection characteristic includes a traffic quality of service type.

Moreover in accordance with a preferred embodiment of the present invention the at least one ATM connection characteristic includes a function which the ATM connection serves.

There is also provided in accordance with another preferred embodiment of the present invention a method for analyzing performance of an ATM network, the network including a first plurality of stations to be interconnected by a second plurality of ATM connections, the method including intercepting at least one ATM connection characteristic of each of the second plurality of ATM connections and storing the at least one ATM connection characteristic in an ATM connection characteristic memory, monitoring at least one operation parameters of each of the second plurality of ATM connections and storing the operation parameters in the ATM connection characteristic memory, for at least one ATM connection subset including at least two of the second plurality of ATM connections which complies with a retrieval key, the retrieval key including a combination of at least one of the ATM connection characteristics, retrieving from the memory, using the retrieval key, the operation parameters for each ATM connection in the ATM connection subset and combining the operation parameters into a subset operation characterizing value which characterizes the operation of the subset, and generating an output representation of the subset operation characterizing value.

Further in accordance with a preferred embodiment of the present invention the at least one operation parameter includes at least one parameter characterizing errors transmitted over the ATM connection.

Still further in accordance with a preferred embodiment of the present invention the step of generating an output representation includes generating a computer display.

Additionally in accordance with a preferred embodiment of the present invention the step of generating an output representation includes generating an alarm when a threshold value is reached.

There is also provided in accordance with another preferred embodiment of the present invention ATM network apparatus including a first plurality of network elements including a plurality of stations and at least one switch, and a second plurality of ATM connections, wherein the first plurality of stations is interconnected by the second plurality of ATM connections associated with at least one switch, and wherein at least one of the first plurality of network elements includes operation parameter analysis apparatus, the operation parameter analysis apparatus including an ATM connection characteristic memory, an ATM connection characteristic monitor operative to intercept at least one ATM connection characteristic of each of the second plurality of ATM connections and to store the at least one ATM connection characteristic in the ATM connection characteristic memory, an ATM connection operation parameter monitor operative to monitor at least one operation parameters of each of the second plurality of ATM connections and to store the operation parameters in the ATM connection characteristic memory, an ATM connection operation parameter analyzer operative, for at least one ATM connection subset including at least one of the second plurality of ATM connections which complies with a retrieval key, the retrieval key including a combination of at least one of the ATM connection characteristics, to retrieve from the memory, using the retrieval key, the operation parameters for each ATM connection in the ATM connection subset and to combine the operation parameters into a subset operation characterizing value which characterizes the operation of the subset, and output apparatus operative to generate an output representation of the subset operation characterizing value.

Further in accordance with a preferred embodiment of the present invention the at least one network element which includes the operation parameter analysis apparatus includes at least one station.

Still further in accordance with a preferred embodiment of the present invention the at least one network element which includes the operation parameter analysis apparatus includes at least one switch.

Additionally in accordance with a preferred embodiment of the present invention the at least one network element which includes the operation parameter analysis apparatus includes a plurality of network elements each including the operation parameter analysis apparatus and also including an output value processing unit operative to receive a fifth plurality of subset operation characterizing values from a fifth plurality of ATM connection operation parameter analyzers and to combine the fifth plurality of subset operation characterizing values into a single value.

Moreover in accordance with a preferred embodiment of the present invention the retrieval key includes a Boolean combination of a plurality of the ATM connection characteristics.

Further in accordance with a preferred embodiment of the present invention the step of monitoring the amount of traffic includes monitoring the traffic passing, in one direction, over each of the second plurality of ATM connections.

Still further in accordance with a preferred embodiment of the present invention the traffic service type includes at least one of the following: CBR, RT-VBR, NRT-VBR, VBR, ABR.

Additionally in accordance with a preferred embodiment of the present invention the function which the ATM connection serves includes at least one of the following: PNNI, signaling, LAN-emulation.

Moreover in accordance with a preferred embodiment of the present invention the step of monitoring the amount of traffic includes separately monitoring the amount of traffic passing, in each of two directions, over each of the second plurality of ATM connections.

Further in accordance with a preferred embodiment of the present invention each of the second plurality of ATM connections includes a plurality of sub-connections, and the step of monitoring the amount of traffic comprises separately monitoring the amount of traffic passing over each sub-connection of each of the second plurality of ATM connections.

Still further in accordance with a preferred embodiment of the present invention the ATM connection characteristics include a sub-connection identifier.

Additionally in accordance with a preferred embodiment of the present invention the sub-connection identifier includes a direction associated with the sub-connection.

There is also provided in accordance with another preferred embodiment of the present invention ATM operation parameter analysis apparatus for use in conjunction with an ATM network, the ATM network including a first plurality of network elements including a plurality of stations and at least one switch, and a second plurality of ATM connections, wherein the first plurality of stations is interconnected by the second plurality of ATM connections associated with at least one switch, the operation parameter analysis apparatus including an ATM connection characteristic memory, an ATM connection characteristic monitor operative, as each of the second plurality of ATM connections is established, to intercept at least one ATM connection characteristic of each of the second plurality of ATM connections and to store the at least one ATM connection characteristic in the ATM connection characteristic memory, an ATM connection operation parameter monitor operative to monitor at least one operation parameters of each of the second plurality of ATM connections and to store the operation parameters in the ATM connection characteristic memory, an ATM connection operation parameter analyzer operative, for at least one ATM connection subset including at least one of the second plurality of ATM connections which complies with a retrieval key, the retrieval key including a combination of at least one of the ATM connection characteristics, to retrieve from the memory, using the retrieval key, the operation parameters for each ATM connection in the ATM connection subset and to combine the operation parameters into a subset operation characterizing value which characterizes the operation of the subset, and output apparatus operative to generate an output representation of the subset operation characterizing value.

Intercepting of ATM connection characteristics may either be during or after establishment of the ATM connections.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1A:
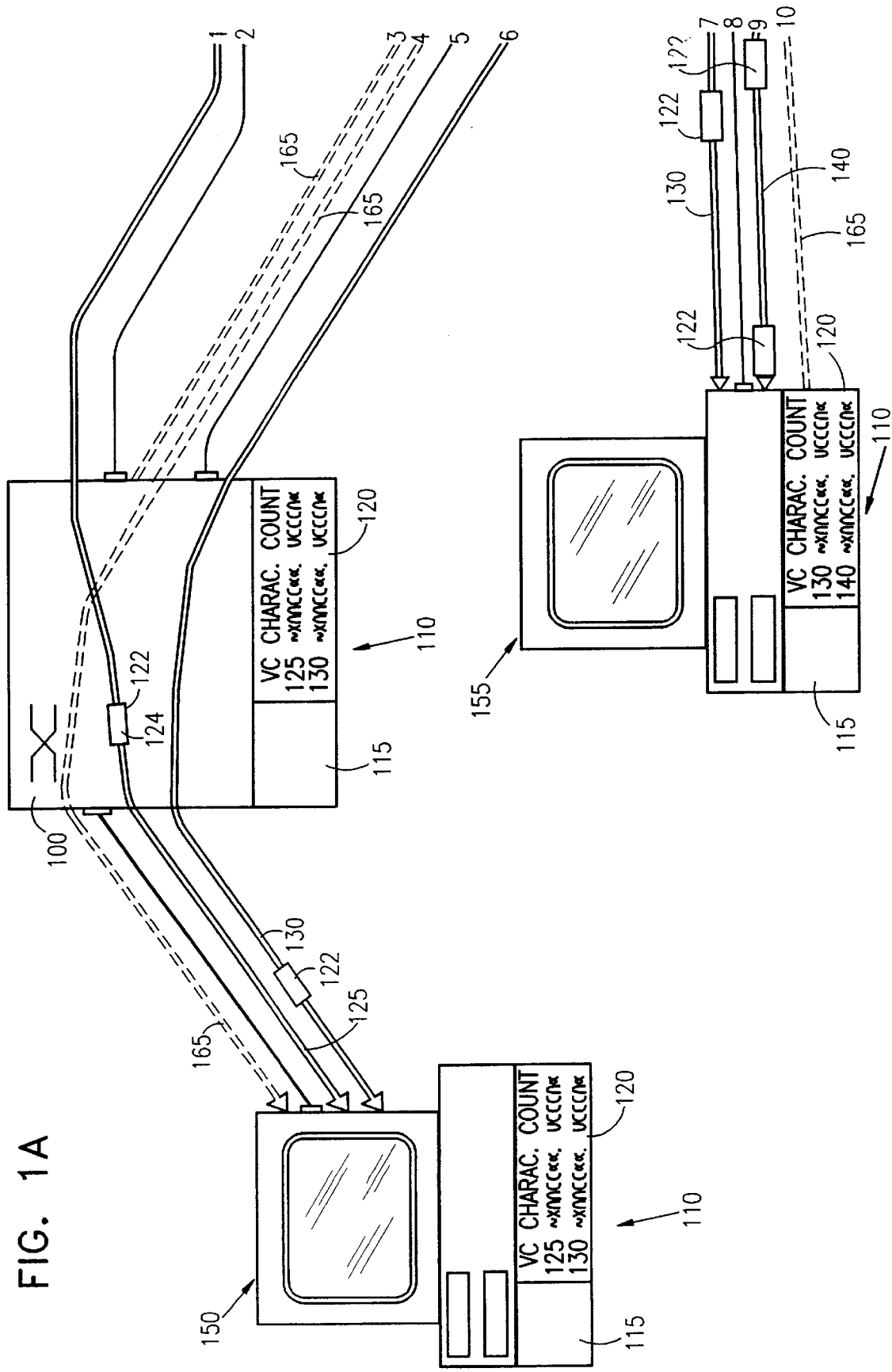
FIGS. 1A and 1B, taken together, comprise a simplified partly pictorial, partly block-diagram illustration of a system for analyzing operational parameters on an ATM network constructed and operative in accordance with a preferred embodiment of the present invention.
Figure 1B:
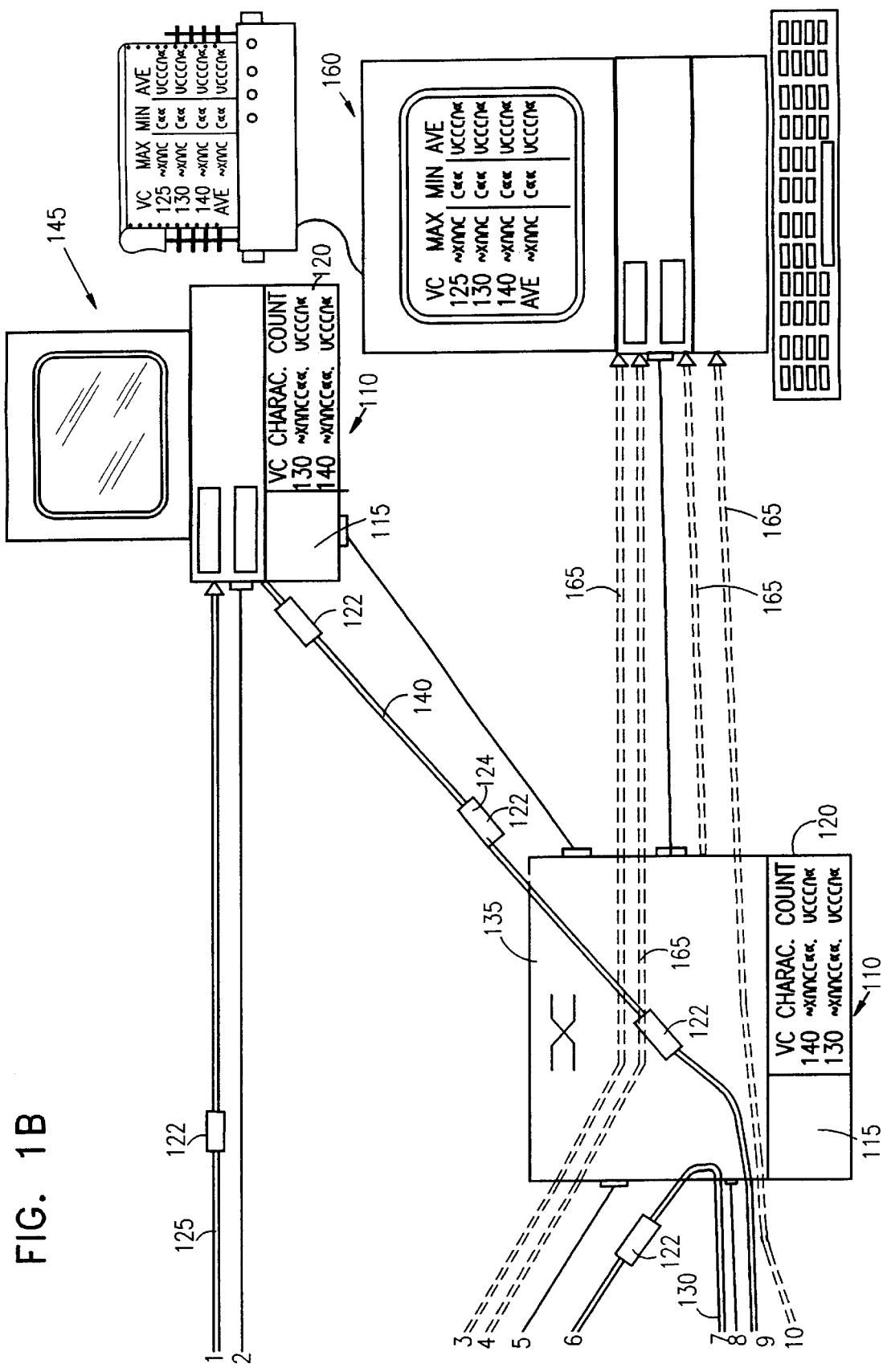

Reference is now made to FIGS. 1A and 1B which illustrates a system for analyzing operational parameters in an asynchronous transfer mode (ATM) network constructed and operative in accordance with a preferred embodiment of the present invention. The terms "operational parameters" or "operation parameters", as used herein, refer to any one or more suitable operational parameters of an ATM network such as, for example, network traffic or network errors. Throughout the present specification, traffic is used as a particular example of an operational parameter when describing specific embodiments of the present invention. It is appreciated, however, that whenever the term "traffic" is used in describing specific embodiments of the present invention any other appropriate operational parameter, such as errors or such as a combination of one or more operational parameters, may also be used in place of or in addition to traffic.

The system of FIGS. 1A and 1B preferably comprises a first ATM switch 100, which may be any suitable ATM switch such as, for example, a Collage 740 Switch, commercially available from Madge Networks UK, Ltd., facsimile number (+044)-1-628-858016. The first ATM switch 100 preferably comprises a traffic analysis unit 110. Typically, the traffic analysis unit 110 comprises a suitably programmed processor 115 comprising suitable memory (not shown in FIGS. 1A and 1B), which processor 115 may preferably be an existing processor comprised in a suitable commercially available ATM switch used as the first ATM switch 110 or may alternatively be a suitable processor added to such suitable commercially available ATM switch. The traffic analysis unit also preferably comprises a traffic counter unit 120, which preferably comprises traffic counter hardware embedded in a suitable commercially available ATM such as a suitable commercially available ATM switch used as the first ATM switch 100. It is appreciated that, in the case where the particular ATM switch used as the first ATM switch 100 does not comprise embedded traffic counter hardware, such traffic counter hardware may be provided as part of the traffic counter unit 120, as is well known in the art. A preferred implementation of the traffic analysis unit 110 is described more fully below with reference to FIG. 2.

The term "ATM connection", as used herein, refers to the provision, over an ATM network, of a connection between two or more stations on the network, the connection typically comprising switching of cells such as ATM cells 122, each ATM cell 122 typically comprising data, from at least one source station to one or more destination stations, using ATM methods as are well known in the art. The switching of cells is typically provided in an ATM network by an ATM switch such as the first ATM switch 100. ATM connections are well known in the art and are described, for example, in UNI 3.1, published by the ATM Forum, referred to above.

It is appreciated that an ATM connection may be one-way, that is, may carry data only in one direction from, for example, a first station to a second station. Alternatively, an ATM connection may be two-way, that is, may carry data in both directions between, for example, a first station and a second station. Furthermore, it is appreciated that a two-way connection may comprise two one-way connections, one in each direction. Use of the term "ATM connection" herein is not meant to be limiting, and may be taken to refer, for example, to either a one-way connection or a two-way connection.

It is also appreciated that an ATM connection, typically a two-way connection, may be considered to comprise a plurality of sub-connections, each such sub-connection typically being a one-way connection. The term "ATM connection", as used herein, is understood to include such a sub-connection. Each sub-connection may be taken as having an identifier, typically comprising an indication of the direction of the subconnection.

As is well known in the art and as is described in, for example, ATM UNI 3.1, referred to above, cells typically include data information. Typically, all cells associated with an ATM connection include an ATM connection ID identifying the ATM connection.

A process known herein as an ATM connection establishment process is used to establish an ATM connection. A plurality of cells are typically used in the ATM connection establishment process. For the purposes of clarity of description, a cell used to establish a connection is termed herein a "connection establishment cell", such as connection establishment cells 124; it is appreciated that connection establishment cells 124 are typically a special case of ATM cells 122, differing from other ATM cells 122 primarily in that connection establishment cells 124 are used as part of an ATM connection establishment process. Typically, some connection establishment cells 124 may comprise data describing the ATM connection to be established such as, for example, the identity of the stations to be interconnected by the ATM connection being established.

It is appreciated that, generally, extraction of meaningful data from cells includes assembling a plurality of cells into a frame. The process of assembling a plurality of cells into a frame is well-known in the art.

As is well known in the art and as is described, for example, in Specification for LAN Emulation over ATM, referred to above, in an ATM network ATM connections can be used to emulate other kinds of network connections, typically in order to allow existing software which relies on such other connections to participate in an ATM network. Such emulation generally occurs using protocols which define the rules for carrying out the emulation. One example of such emulation is emulation of a local area network (LAN). An ATM connection used for emulation of a LAN, for example, is termed herein a LAN-emulation ATM connection, and a particular function performed by the LAN-emulation protocol connection and defining the LAN-emulation functionality of the connection is termed herein a LAN-emulation protocol type or LAN-emulation protocol ID.

As is well known in the art and is described, for example, in the ATM UNI 3.1, referred to above, ATM connections have various associated characteristics, including:

traffic service type, which may typically comprise one of the following: CBR, RT-VBR, NRT-VBR, VBR, ABR, or another appropriate type; and application or function served, which may typically comprise one of the following: PNNI, signaling, LAN-emulation, or another appropriate function.

As is well known in the art, an ATM connection may have errors in the sense that at least one of the cells comprised in the ATM connection may be marked as erroneous, that is, as an errored cell, which is typically termed in the art "a bad HEC cell".

The traffic analysis unit 110 comprised in the first ATM switch 100 is preferably operable to analyze ATM traffic on ATM connections passing through the first ATM switch 100, such as a first ATM connection 125 and a second ATM connection 130. The analysis preferably occurs during creation of the ATM connection, also known as signaling setup phase. In order to perform said analysis, the traffic analysis unit 110 comprised in the first ATM switch 100 typically is also operative to store ATM connection characteristic information relating to ATM connections passing through the first ATM switch 100, the ATM connection characteristic information typically comprising the following:

an ATM connection ID identifying the ATM connection;

one or more ATM connection characteristics characterizing the ATM connection, the ATM connection characteristics typically comprising one or more of the following:

the identity of at least one of the stations interconnected by the ATM connection;

whether the ATM connection is a LAN-emulation ATM connection and, if so, the LAN-emulation protocol ID of the ATM connection;

traffic service type of the ATM connection, indicating the type of traffic service being provided by the ATM connection;

function served by the ATM connection such as, for example, a type of application service being provided by the ATM connection, such as, for example, LAN-emulation or PNNI.

While only two ATM connections are depicted in FIGS. 1A and 1B as passing through the first ATM switch 100, it is appreciated that, generally, a very large number of ATM connections may pass through the first ATM switch 100, such as, for example, 5,000 ATM connections. The operation of the traffic analysis unit 110 is described more fully below with reference to FIG. 3.

The system of FIGS. 1A and 1B optionally also comprises a second ATM switch 135. The second ATM switch 135, if present, may be similar to the first ATM switch 100, described above. While two ATM switches 100 and 135 are depicted in FIGS. 1A and 1B it is appreciated that only one ATM switch or, alternatively, a plurality of ATM switches may be used. The traffic analysis unit 110 comprised in the second ATM switch 135 is preferably operable to analyze ATM traffic on ATM connections passing through the second ATM switch 135, such as the second ATM connection 130 and a third ATM connection 140.

The system of FIGS. 1A and 1B preferably also comprises a plurality of ATM stations, shown in FIGS. 1A and 1B as ATM end stations 145, 150, and 155. It is appreciated that while, for the sake of simplicity, three ATM end stations 145, 150, and 155 are shown in FIGS. 1A and 1B, a larger number of ATM end stations such as, for example, 5,000 ATM end stations may be also used. Each of the ATM end stations 145, 150, and 155 may be any suitable ATM end station, such as a Collage 530, available from Madge Networks UK Ltd., referred to above.

The ATM end stations 150 and 155 each preferably comprise a traffic analysis unit 110, each traffic analysis unit 110 being preferably similar to the traffic analysis unit 110 described above with reference to the first ATM switch 100 and the second ATM switch 135. The traffic analysis unit 110 comprised in the ATM end station 150 is preferably operable to analyze ATM traffic on one or more ATM connections in which the ATM end station 150 participates, such as the first ATM connection 125 and the second ATM connection 130. The traffic analysis unit 110 comprised in the ATM end station 155 is similarly preferably operable to analyze ATM traffic on one or more ATM connections in which the ATM end station 155 participates, such as the second ATM connection 130 and the third ATM connection 140.

The ATM connections 125, 130, and 140 are each depicted in FIGS. 1A and 1B for the sake of simplicity as being two-way ATM connections, each being capable of carrying data in both directions between stations which participate in the ATM connection. It is appreciated, however, that one or more of the ATM connections 125, 130, and 140, for example, need not be two-way ATM connections but may be one-way ATM connections capable of carrying data only in one direction, or may be any other appropriate type of ATM connection available in an appropriate ATM network.

The system of FIGS. 1A and 1B also preferably comprises a data presentation unit 160, which may be any suitable pro-rammed computer such as a suitably programmed SPARC 5 Station, commercially available from Sun Microsystems, USA. The data presentation unit 160 is preferably operable to receive, typically via one or more ATM data connections 165, at least one result of traffic analysis performed by one or more of the traffic analysis units 110. The result typically comprises information about one or more ATM connections, the information typically comprising ATM connection characteristics and other information resulting from analysis of said one or more ATM connections by said one or more traffic analysis units 110, as described above.

The data presentation unit 160 is also preferably operable to display one or more results of said analysis. The data presentation unit 160 may preferably be operable to perform one or more of the following: to display said results on a display screen; to print said results; to store said results on an electronic medium or any other medium; to further process said results; or to send said results to another unit (not shown) via the ATM network or by any other means.

The data presentation unit 160 may also be operable to combine and process the data from one or more of the traffic analysis units 110 prior to, during, or after any of the previously mentioned operations performed by the data presentation unit 160. Such combining and processing may preferably include any appropriate combining and processing, such as, for example, one or more of the following: combining related data by summing or otherwise, computing an average, or computing a statistical result.

The data presentation unit 160 is shown in FIGS. 1A and 1B as a unit separate from other elements of FIGS. 1A and 1B. It is appreciated, however, that the data presentation unit may alternatively be comprised in an ATM switch such as the first ATM switch 100 or the second ATM switch 135, or with an ATM end station such as one or more of ATM end stations 145, 150, and 155. It is also appreciated that a plurality of data presentation units 160 may be used.

The operation of the system of FIGS. 1A and 1B is now briefly described. Except when otherwise stated, the description of the operation of the system of FIGS. 1A and 1B, when making reference to one of the traffic analysis units 110, may preferably apply to any one or more of the traffic analysis units 110 in the system of FIGS. 1A and 1B, including traffic analysis units 110 comprised in an ATM switch such as the first ATM switch 100 or the second ATM switch 135, and traffic analysis units 110 comprised in an ATM end station such as one or more of the ATM end stations 145, 150, and 155.

One of the traffic analysis units 110 such as, for example, the traffic analysis unit 110 comprised in the ATM switch 100, listens to cells as the cells pass through the ATM switch 100. The terms "listen" and "intercept" are used interchangeably throughout the present specification to refer to analyzing certain characteristics of cells as they pass through the ATM switch 100 comprising the traffic analysis unit 110, without interrupting or disturbing the passing of the cells through the ATM switch 100. Preferably, the traffic analysis unit 100 is operative to listen to all such cells.

The traffic analysis unit 110 comprised in the ATM switch 100 is preferably operable, in intercepting such cells, to listen for a connection setup process comprising at least one connection establishment cell 124, as described above. A connection setup process, as described above, is a process setting up an ATM connection between two or more stations, typically using a signaling protocol as defined, for example, in ATM UNI 3.1, referred to above. A connection setup process typically comprises transmitting ATM connection characteristic information comprising one or more of the following:

the identity of the stations interconnected by the ATM connection;
whether the ATM connection is a LAN-emulation ATM connection and, if so, the LAN-emulation protocol ID of the ATM connection;
traffic service type of the ATM connection, indicating the type of traffic service being provided by the ATM connection;
function served by the ATM connection such as, for example, a type of application service being provided by the ATM connection, such as, for example, LAN-emulation or PNNI.

The traffic analysis unit 110 is preferably also operative, upon identifying a connection setup process, to store one or more item of ATM connection characteristic information comprised in the connection setup process in an ATM connection characteristic memory (not shown in FIGS. 1A and 1B) typically comprised in the traffic analysis unit 110. It is a particular feature of the present invention that, by listening to connection setup processes, ATM connection characteristic information such as that mentioned above may be identified and stored for later use in analyzing one or more operational parameters of an ATM connection.

The traffic analysis unit 110, having thus identified an ATM connection, is preferably operative to monitor ATM cells 122 and to store traffic information from the traffic counter 120, and/or information on other operation parameters thereof as described above, in the ATM connection characteristic memory. Said stored information is preferably stored according to ATM connection characteristic; that is, for example, in the case of ATM connection characteristic "the ATM connection comprises traffic sent from end station 150", sufficient information is preferably stored to enable retrieval of stored information for all such ATM connections having the ATM connection characteristic "the ATM connection comprises traffic sent from end station 150". Another example of an ATM connection characteristic would be "the ATM sub-connection direction is from end station 150". It is appreciated that there is a wide variety of possible examples.

Upon request, typically upon request from the data presentation unit 160, the traffic analysis unit 110 is preferably operable to transmit a result of said request to the data presentation unit 160, typically via one of the ATM data connections 165. The request typically comprises a retrieval key indicating ATM connection characteristics for which the operational parameters of ATM connections with the ATM connection characteristics indicated by the retrieval key, are of interest. Such a retrieval key might, for example, comprise "the ATM connection comprises traffic sent from end station 150". Such a retrieval key might also comprise a Boolean combination of ATM connection characteristics such as, for example "the ATM connection comprises traffic sent from end station 150 OR the ATM connection comprises traffic sent from end station 155".

In producing the result, the traffic analysis unit 110 preferably combines the stored operation parameters for one or more ATM connections which match the retrieval key. In the case where the stored operation parameter is traffic, combining typically comprises adding to-ether to form a sum. It is appreciated, however, that in the case of traffic and in the case of other operation parameters, such combining may comprise applying any of a wide variety of appropriate multi-variable functions to said stored operation parameters such as, for example, a maximum or minimum function or other appropriate multi-variable function.

The data presentation unit 160, upon receiving the result, preferably generates an output representation of the result. The output representation may include any appropriate output representation such as, for example:

generating a computer display;
generating a hardcopy display;
storing the result on a magnetic computer medium or any other appropriate computer medium; or
generating an alarm when a threshold value is reached, the threshold value typically representing a maximum or minimum desirable value for the operation parameter.

Figure 2:
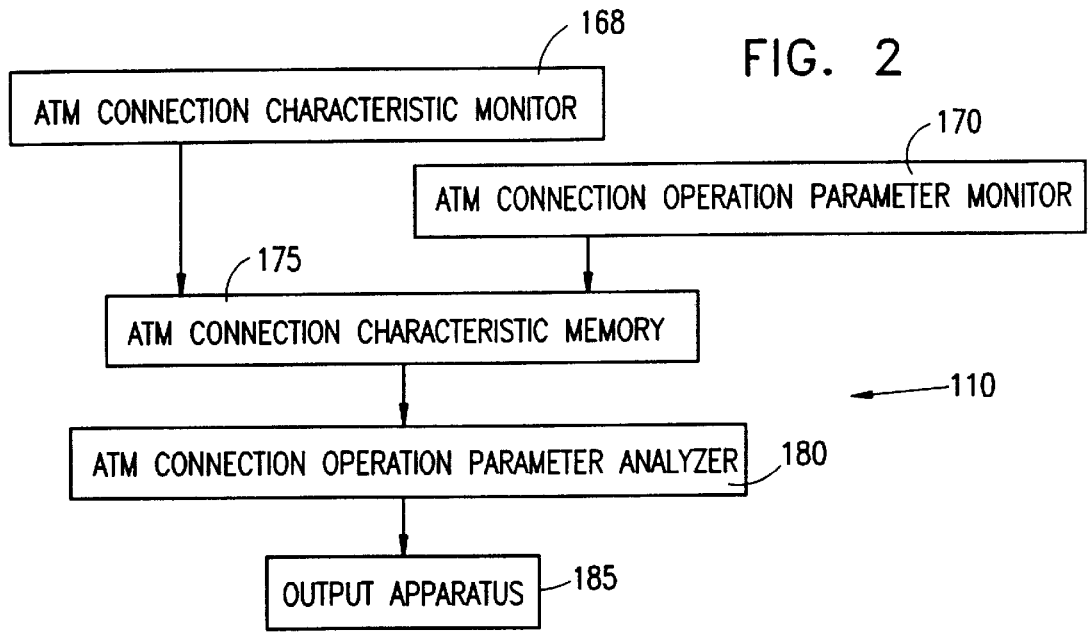
FIG. 2 is a simplified block diagram illustration of a preferred implementation of the traffic analysis unit 110 of FIGS. 1A and 1B.

Reference is now made to FIG. 2, which is a simplified block diagram illustration of a preferred implementation of the traffic analysis unit 110 of FIGS. 1A and 1B. The apparatus of FIG. 2 preferably comprises an ATM connection characteristic monitor 168, preferably operative to monitor ATM connection characteristic parameters of ATM connections passing through the unit which comprises the traffic analysis unit 110.

The apparatus of FIG. 2 also preferably comprises an ATM connection operation parameter monitor 170, preferably operative to monitor ATM connection operation parameters of ATM cells 122 passing through the unit which comprises the traffic analysis unit 110.

The apparatus of FIG. 2 also preferably comprises an ATM connection characteristic memory 175, preferably operative as described above with reference to FIGS. 1A and 1B to store ATM connection characteristics, typically received from the ATM connection characteristic monitor 168, and/or ATM connection operation parameters, typically received from the ATM connection operation parameter monitor 170.

The apparatus of FIG. 2 also preferably comprises an ATM connection operation parameter analyzer 180 which is preferably operative to process a request including a retrieval key and to combine information stored in said ATM connection characteristic memory 175 to form a result of said request.

The apparatus of FIG. 2 also preferably comprises output apparatus 185 which is preferably operable to transmit the result to the unit which made the request, typically the data presentation unit 160. Typically, the results are transmitted over the ATM network using the SNMP protocol, described, for example, in The Simple Book, referred to above. It is appreciated that functions described above with reference to the data presentation unit 160 may, alternatively or in addition, be performed by the output apparatus 185.

Figure 3:
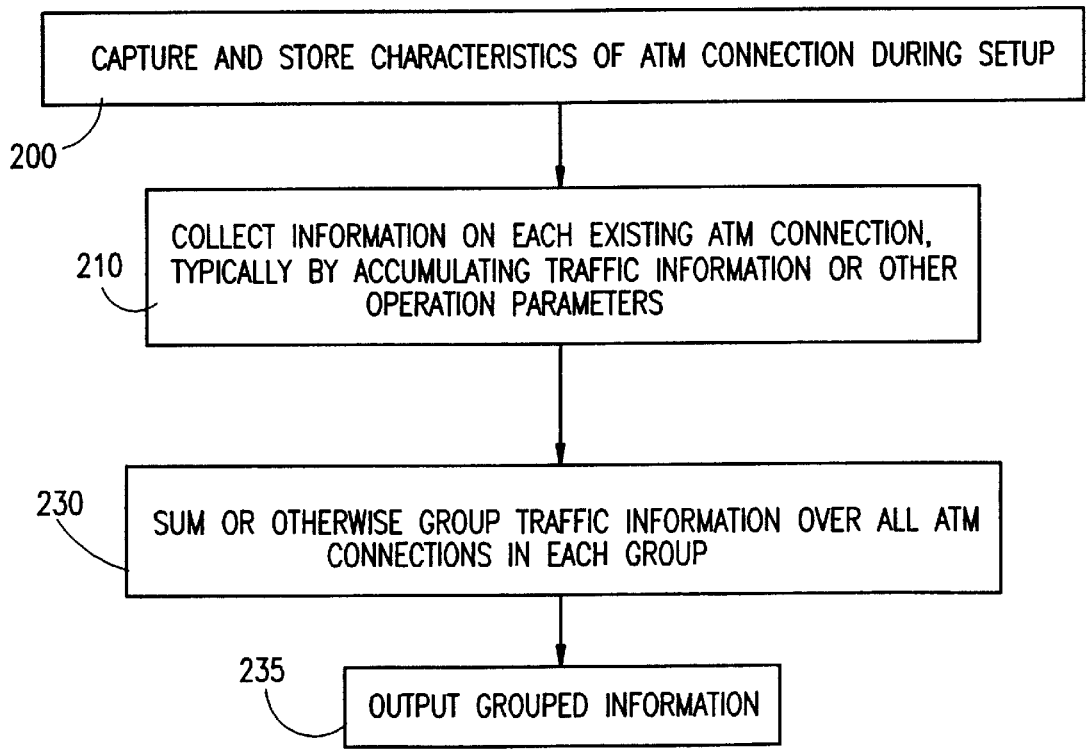
FIG. 3 is a simplified flowchart illustration of a preferred method of operation of the traffic analysis unit 110 of FIGS. 1A and 1B.

Reference is now made to FIG. 3, which is a simplified flowchart illustration of a preferred method of operation of the traffic analysis unit 110 of FIGS. 1A and 1B. The method of FIG. 3 preferably comprises the following steps:

The traffic analysis unit 110 captures and stores ATM connection characteristics during ATM connection setup (step 200), thus storing identification and characteristic information for one or more of the existing ATM connections which pass through the unit in which the traffic analysis unit 110 is comprised. The information is typically stored in the ATM connection characteristic memory 175 (FIG. 2).

The traffic analysis unit 110 collects information, preferably on each ATM connection for which information was stored in step 200 (step 210). Typically, in the case of traffic information, the information is collected by accumulating traffic information from embedded traffic counter hardware, which may be provided, as described above, as part of the traffic counter unit 120. In the case of other information such as, for example, error information, the information may typically be collected from other counter hardware which may be provided as part of the traffic counter unit 120 or otherwise as part of the ATM switch 100, or may be obtained by intercepting ATM cells 122 as described above. The information collected in step 210 is typically stored in the ATM connection characteristic memory 175 (FIG. 2).

Typically, upon request from the data presentation unit 160 or otherwise, the traffic analysis unit 110 groups the information stored in steps 200 and 210 according to a search key provided as part of the request (step 230). It is appreciated that, as explained above, grouping may comprise summing or some other appropriate multi-variable function of the information. The grouped information is then output (step 235), typically to the source of the request such as, for example, the data presentation unit 160.

Figure 4:
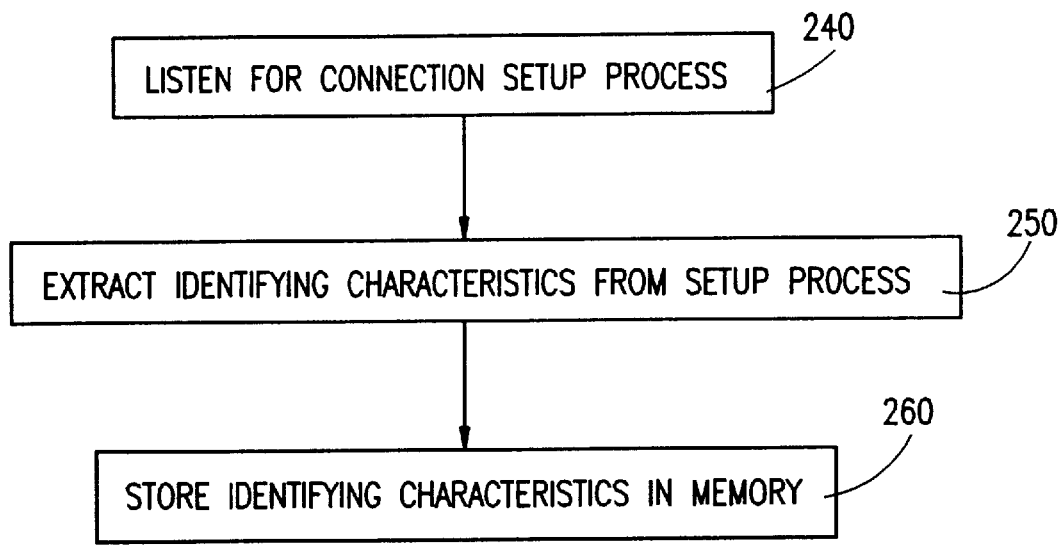
FIG. 4 is a simplified flowchart illustration of a preferred implementation of step 200 of FIG. 3.

Reference is now made to FIG. 4, which is a simplified flowchart illustration of a preferred implementation of step 200 of FIG. 3. The method of FIG. 4 preferably comprises the following steps:

The traffic analysis unit 110 listens, as described above, for one or more connection setup processes (step 240). The traffic analysis unit 110 then extracts identifying characteristics from the one or more connection setup processes (step 250), and stores the identifying characteristics, typically in the ATM connection characteristic memory 175 (FIG. 2) (step 260).

Figure 5:
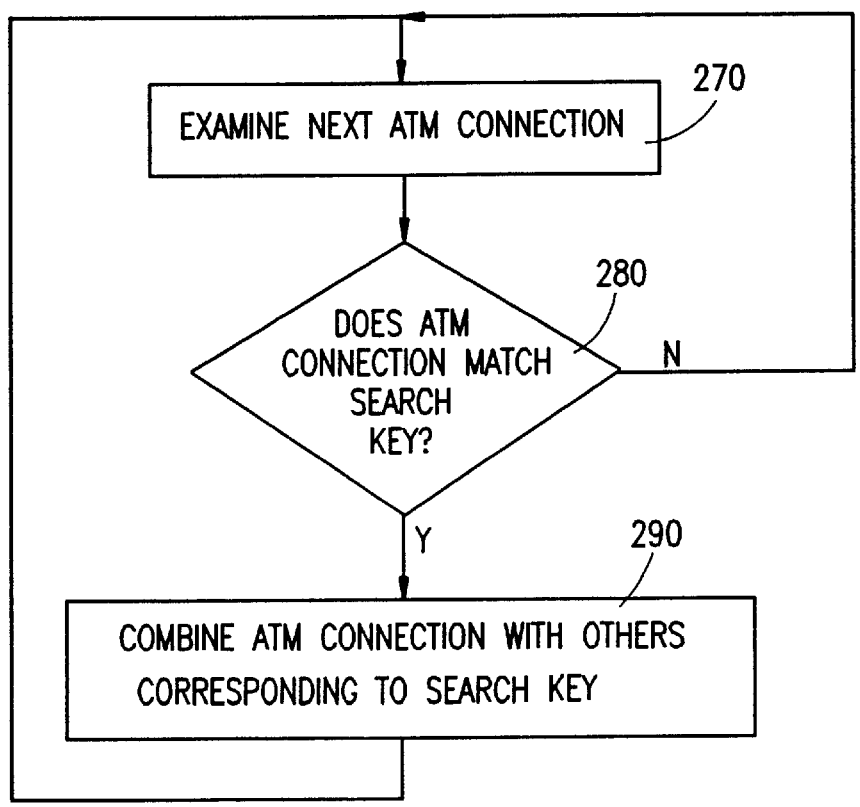
FIG. 5 is a simplified flowchart illustration of a preferred implementation of a portion of step 230 of FIG. 3.

Reference is now made to FIG. 5, which is a simplified flowchart illustration of a preferred implementation of a portion of step 230 of FIG. 3, in which grouping or summing is performed. The method of FIG. 5 preferably includes the following steps:

ATM connections are preferably grouped according to a search key as follows. The next ATM connection, which may be the first ATAM connection, is preferably examined (step 270). If no ATM connections remain, the method of FIG. 5 preferably terminates.

A check is preferably made to see whether the stored characteristics of the ATM connection match the search key (step 280). If not processing continues with step 270.

If the stored characteristics of the ATM connection did match the search key in step 280, the stored ATM connection is preferably combined, as described above, with stored data from other ATM connections corresponding to the search key. Processing then continues with step 270.

There follows a detailed description of a preferred embodiment of the traffic analysis unit 110 of FIGS. 1A and 1B, particularly for use with the Collage 740 Switch referred to above or with any ATM switch constructed as defined in ATM Forum specifications, obtainable by joining the ATM FORUM. The ATM Forum's Internet address is: http://www.atmforum.com.

1. General

1.1. Overview

AMON—ATM Remote Monitoring, is a method which provides monitoring capabilities of ATM networks in a fashion similar to that provided for shared networks by RMON compliant probes. AMON uses the RMON MIB (to the possible extent), and incorporates a hierarchical monitoring strategy.

AMON may be provided by embedded software running in the ATM switch in parallel to the switch's other packages, and by a graphical management application used for displaying the information.

The applications provided by AMON are:

ATM Switch Statistics: provides aggregate statistics on the behavior of the switch.

ATM Port Statistics: provides statistics on the traffic passing through all the switch's ports.

ATM Host Statistics: provides statistics on the traffic produced by all ATM hosts communicating through the switch. ATM Hosts are identified by their ATM addresses and not by their MAC addresses.

ATM Host Matrix: provides a host matrix on all sessions passing through the switch. The matrix relates to ATM addresses and not to MAC addresses.

The first phase of AMON provides monitoring, capabilities for the following, ATM forum standards:

UNI 3.0 and 3.1

LANE 1.0

1.2. Host/Matrix Support

The AMON Host and Matrix applications are heavy users of memory. As a result, the amount of addresses and address pairs which are stored and supported by each application are a function of the amount of memory which is installed on the switch:

| Memory on switch | ATM addresses supported in Host statistics | ATM address pairs supported in Host Matrix |
|---|---|---|
| 8M | 400 | 1,000 |
| 16M and higher | 4,000 | 10,000 |

1.3. Limitations

1. ATM Host and Matrix statistics are typically partially dependent on the transmission of the Calling Address IE during signaling setup. LANE stations typically transmit this IE, and are therefore fully analyzed by AMON. However, other ATM stations may not transmit this IE, and as a result the ATM statistics which are collected for these stations (in the ATM Host and Matrix applications) may be partial.
2. In Signaling 4.0, when leaf initiated join without root notification is used by a host, and the join is performed by a switch which is downstream to the switch in which AMON is performed, AMON has no knowledge of the new station, and therefore is not able to report traffic pertaining to this ATM station.

1.4. Definition & Abbreviation

AMON—ATM remote MONitoring
RMON—Remote MONitoring
Eth10—Ethernet 10 Mbps
Eth100—Ethernet 100 Mbps
NMS—Network Management Station
BUS—the LAN Emulation Broadcast and Unknown Server
ELAN—Emulated LAN
LANE—the LAN Emulation protocol
LEC—LAN Emulation Client
LECS—LAN Emulation Configuration Server
LES—LAN Emulation Server

2. The AMON Probe

2.1. Overview

The AMON probe is a part of the ATM switch's software, running in parallel to other functions performed by the CPU. The probe collects ATM level statistics. These are collected by analyzing various properties of the VCs during signaling setup (using information available in the setup process), and correlating this data with the per-VC counters collected by the switch's HW. This enables the CPU to collect RMON-like statistics at the ATM level.

2.2. ATM Statistics

ATM level statistics are collected by analyzing properties of the VCs during signaling setup, and correlating these properties with the cell counters provided per VC by the switch's HW.

The ATM level functions provided by the AMON probe are:

ATM Switch Statistics,
ATM Port Statistics
ATM Host Statistics
ATM Host Top N,
ATM Host Matrix, ATM Switch statistics and ATM Port statistics are collected by the probe at all times. The other 3 groups—ATM Host, ATM Host Top N, and ATM Matrix statistics are collected by the probe upon request from the management station. The probe is capable of collecting all groups simultaneously.

2.2.1. Required Signaling Information

To enable the probe to collect ATM level statistics, the switch's signaling entity typically transfers to the AMON entity for all connections passing through the switch, data which typically but not necessarily includes the following:

ATM addresses connected at both sides of the connection,
The connection's calling party,
For Point-to-Multipoint connections—the root (for UNI 3.0 and 3.1 this is actually redundant with the calling party).
Service used by the connection (ABR, UBR, VBR, or CBR),
Amount of bandwidth allocated to the VC,
Point-to-Point or Point-to-Multipoint,
The usage of the VC: PNNI, Signaling, LANE Control/Configuration, LANE 802.3 Data Direct, LANE 802.5 Data Direct, LANE 802.3 Multicast, LANE 802.5 Multicast, or "other".
The creation order of the VC (in relation to other VCs).

Notes:

1. The above list defines the data that will be available internally to the AMON task, and not externally via MIB.

2.2.1.1. Connection Types

This section describes one possible implementation for collecting data on point-to-multipoint connections.

Point-to-Multipoint connections maintained by the connection manager typically have one of 3 types:

Root: this is the end to which the calling ATM entity is connected.
Branch: this is an internal branching. The maximum possible number of branches is the number of physical ports in the switch.
Leaf: a single leaf exists for each of the multipoint stations.

Figure 6:
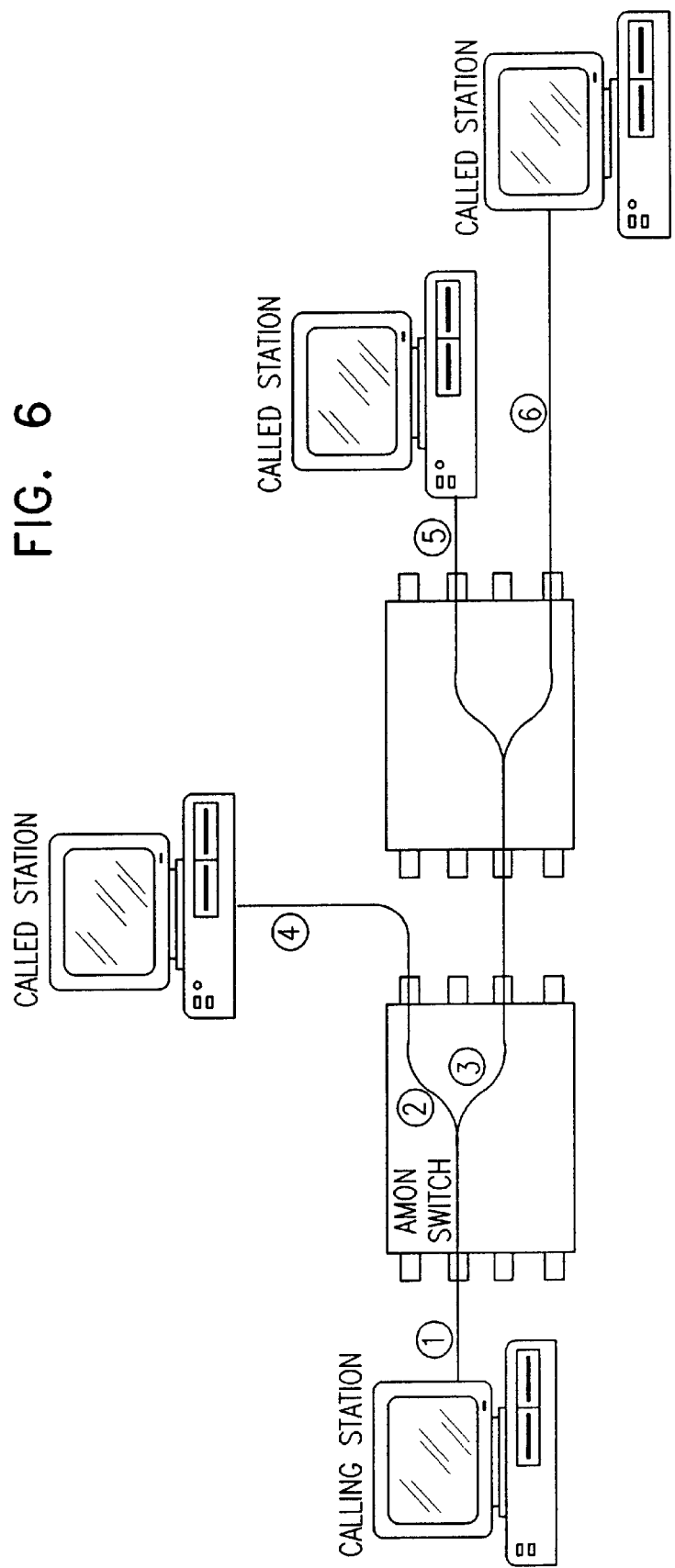
FIG. 6 illustrates the typical connections which are reported in a preferred embodiment of the switch.

FIG. 6 illustrates the typical connections which are reported in a switch of a preferred embodiment of the present invention.

Figure 7:
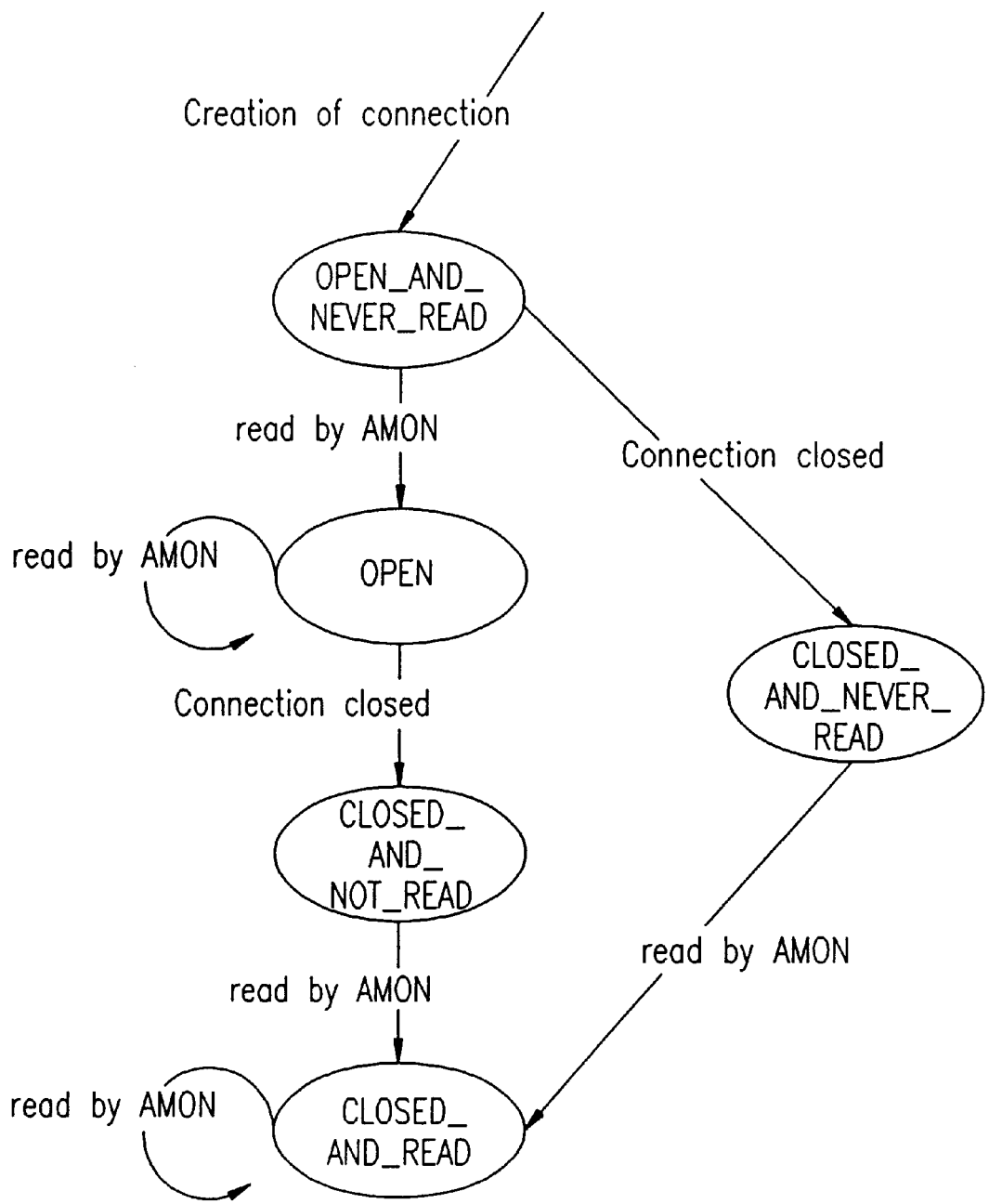
FIG. 7 illustrates the various states of a connection in a preferred embodiment of the present invention.

The connection types which are typically reported to AMON are:
Conn. #1—Tunck
Conn. #2—Branch
Conn. #3—Branch
Conn. #4—Leaf
Conn. #5—Leaf
Conn. #6—Leaf Each connection remains in the data base for approx. 30 seconds after it is actually deleted from the switch. Each connection has a status to represent this. The various states are represented in FIG. 7.

For point to multi point connections, the probe will use a specific connection type for calculating specific counters, n UNI 3.0 and UNI 3.1. This is described in the following table:

| Type of counter | Connection type to be used when referring to point to multipoint VCs |
| --- | --- |
| Switch Statistics | Only Trunk |
| Port Statistics - Traffic in counters | Only Trunk |
| Port Statistics - Traffic out counters | Only Branch |
| Host Statistics- Traffic in counters | Only Trunk |
| Host Statistics- Traffic out counters | Only Leaf |
| Host Matrix Counters | Only Leaf |

ATM Switch Statistics

This section and all other MIB definitions disclosed herein provide examples of the information that can be collected by AMON. These examples are not intended to be limiting and in particular additional other information can be collected.

The MIB items represent preferred embodiments of the present invention and are not essential features of the invention.

The AMON probe collects statistics related to the switch as a global entity.

Switch statistics which are collected by summing the relevant VC counters of all VCs active on the switch. Statistics are typically collected by the probe at all times. The following table defines the counters which are supported at the switch level

| MIB item | Notes |
| --- | --- |
| 1. DropCellEvents | |
| 2. DropFrameEvents | 0 |
| 3. TotalCells | |
| 4. BadHecCells | |
| 5. DroppedCells | Cells dropped due to congestion on the switch and not cells that the monitor could not count. |
| 6. UbrCells | |
| 7. AbrCells | |
| 8. NonRtVbrCells | |
| 9. RtVbrCells | Will be 0 in V1.2 of the C740. |
| 10. CbrCells | |
| 11. PnniCells | |
| 12. SignalingCells | |
| 13. LaneCells | |
| 14. Lane802Dot3DataDirectCells | |
| 15. Lane802Dot3MulticastCells | |
| 16. Lane802Dot5DataDirectCells | |
| 17. Lane802Dot5MulticastCells | |
| 18. LaneConfigControlCells | |
| 19. TotalBwAllocated | |
| 20. AbrBwAllocated | |
| 21. NonRtVbrBwAllocated | |
| 22. RtVbrBwAllocated | |
| 23. CbrBwAllocated | |

2.2.2. ATM Port Statistics

The AMON probe collects statistics related to the physical ports of the ATM switch. Statistics are collected at all times for all ports in the PortTable. When a port is added to the switch or removed from it in run-time, the table is updated accordingly to reflect the correct status of the switch.

Port statistics are collected by summing the relevant VC counters of all VCs active on the port. The counters which are supported for each port are:

| MIB item | Notes |
| --- | --- |
| 1. PortInCells | |
| 2. PortOutCells | |
| 3. PortInBadHecCells | |
| 4. PortInUbrCells | |
| 5. PortInAbrCells | |
| 6. PortInNonRtVbrCells | |
| 7. PortInRtVbrCells | |
| 8. PortInCbrCells | |
| 9. PortInPointToPointCells | |
| 10. PortInPointToMultipointCells | |
| 11. PortInLane802Dot3DataDirectCells | |
| 12. PortInLane802Dot3MulticastCells | |
| 13. PortInLane802Dot5DataDirectCells | |
| 14. PortInLane802Dot5MulticastCells | |
| 15. PortInLaneConfigControlCells | |
| 16. PortActiveVcs | |
| 17. PortUbrVcs | |
| 18. PortAbrVcs | Will be 0 if ABR is not supported |
| 19. PortNonRtVbrVcs | |
| 20. PortRtVbrVcs | Will be 0 in V1.3 of the C740. |
| 21. PortCbrVcs | |
| 22. PortPointToPointVcs | |
| 23. PortPointToMultipointVcs | |
| 24. PortLane802Dot3DataDirectVcs | |
| 25. PortLane802Dot3MulticastVcs | |
| 26. PortLane802Dot5DataDirectVcs | |
| 27. PortLane802Dot5MulticastVcs | |
| 28. PortLaneConfigControlVcs | |

2.2.3. ATM Host Statistics

ATM Host Statistics are provided by the RMON Host group, and preferably by additional non-RMON mibs. Statistics regarding an ATM host are computed as the sum of the traffic on all VCCs connected to this host. Collection of statistics are activated by the RMON MIB's hostControlTable, both for the RMON MIB counters and for the non-RMON table of the non-RMON mibs.

2.2.3.1. RMON MIB Support

The probe typically supports the following RMON MIB tables:

hostControlTable hostTable hostTimeTable

Support for the RMON tables are is provided according to the definitions in the RMON MIB, with the following modifications which are required for ATM support:

| MIB item | Method of computation | Notes |
| --- | --- | --- |
| hostAddress | The 20 byte ATM address of the host | |
| hostInPkts | hostTimeInCells | Cells are counted instead of packets. |
| hostOutPkts | hostTimeOutCells | |
| hostInOctets | hostInPkts*53 | |
| hostOutOctets | hostOutPkts*53 | |
| hostOutErrors | Always 0 | |
| hostOutBroadcastPks | Always 0 | |
| hostOutMulticastPks | Always 0 | |

The following implementation specific issues are typically utilized:

1. The maximum size of the host table is limited, as defined above. Any hosts over this discovered by the probe are not written to the host tables.

2. The datasource of the hostControlTable can be typically: mib2.interfaces.ifTable.ifEntry.ifIndex.1.
3. When the AMON probe is instructed to start collection of ATM Host statistics, the host tables (hostTable, hostTimeTable, and AtmHostTimeTable) are initialized with entries for all the ATM hosts which are active on the switch at that time.
4. The tables are updated whenever a new ATM address is identified, i.e., when a new VC is created and either of the two hosts communicating on this VC have not yet been registered in the host table.
5. When an existing ATM host disconnects all its connections and stops communicating over the switch, it is removed from the RMON Host tables, and the counters for this entry remain frozen with their last values. If this host later opens new connection on the switch, the probe continues counting using the previously frozen counters.

Trigger:

The collection of ATM Host Statistics is triggered when a valid entry is created in the hostControlTable.

AMON Probe Actions:

When an ATM Host collection session begins, the actions performed by the probe preferably include some or all of the Following actions:

1. Scans the list of existing VCs, and for each of them creates an entry in the hostTable and in the non-RMON atmHostTable.
2. Periodically polls all VCs to update the host counters in both the RMON and non-RMON tables (Note: this is an implementation issue, and polling of all VCs may be performed in other fashions, e.g., in response to an SNMP get request).
3. When a new VC is created, checks if the hosts at the ends of this VC are already in the tables, and if not adds them.
4. When an existing VC is deleted, removes this VC from the list of VCs to be polled, but does not remove the hosts connected to it from the tables.

2.2.4.2 Non-RMON MIB Support

The probe supports the non-RMON atmHostTimeTable. This table is indexed by the same indices as the RMON hostTimeTable, and is created by the RMON hostControlTable. The counters which are typically collected are:

| MIB item | Notes |
|---|---|
| 1. InCells | |
| 2. OutCells | |
| 3. OutUbrCells | |
| 4. OutAbrCells | |
| 5. OutNonRtVbrCells | |
| 6. OutRtVbrCells | Will be 0 in V1.3 of the C740. |
| 7. OutCbrCells | |
| 8. OutPnniCells | |
| 9. OutSignalingCells | |
| 10. InLaneCells | |
| 11. OutLaneCells | |
| 12. OutLane802Dot3DataDirectCells | |
| 13. OutLane802Dot3MulticastCells | |
| 14. OutLane802Dot5DataDirectCells | |
| 15. OutLane802Dot5MulticastCells | |
| 16. OutLaneConfigControlCells | |
| 17. ActiveVcs | |
| 18. UbrVcs | |
| 19. AbrVcs | |
| 20. NonRtVbrVcs | |

-continued

| MIB item | Notes |
|---|---|
| 21. RtVbrVcs | |
| 22. CbrVcs | |
| 23. InPointToMultipointVcs | |
| 24. OutPointToMultipointVcs | |
| 25. PnniVcs | |
| 26. SignalingVcs | |
| 27. Lane802Dot3DataDirectVcs | |
| 28. Lane802Dot3MulticastVcs | |
| 29. Lane802Dot5DataDirectVcs | |
| 30. Lane802Dot5MuticastVcs | |
| 31. LaneConfigAndControlVcs | |

2.2.4. ATM Host Top N

ATM Host Top N provides an agent based sorting mechanism on the data found for ATM hosts. This is done using the standard RMON MIB and non-RMON additions to it.

The AMON probe typically supports all tables required by the Host Top N mechanism, i.e.:

hostTopNControlTable, hostTopNTable.

To support the Top N functionality for the additional counters provided by the non-RMON additions to the RMON MIB's Hosts Group, some new values are added to hostTopNRateBase. The values RateBase values defined in the standard RMON MIB are not supported. The values which are added to hostTopNRateBase are:

hostTopNVcs(101)

hostTopNInCells(102)

hostTopNOutCells(103)

hostTopNOutUbrCells(104)

hostTopNOutAbrCells(105)

hostTopNOutRtVbrCells(106)

hostTopNOutNrtVbrCells(107)

hostTopNOutCbrCells(108)

hostTopNOutLaneCells(109)

Top N statistics are typically limited to a maximum of 30 hosts.

Trigger:

The collection of Host Top N statistics is typically triggered when one of the following happens:

1. A valid entry is created in the hostTopNControlTable, with timeRemaining≠0.
2. The value of timeRemaining in a valid entry is changed to a non-zero value.

NOTE: The following implementation specific issues are typically utilized:

1. The maximum size of the report may typically be 30 hosts. If a manager requests more, the value of hostTopNGrantedSize is typically set to 30 by the agent.
2. The HostTopNTable is updated only when hostTopN-TimeRemaning reaches 0, and then remain s frozen.
3. The minimum allowed value for hostTopNTimeRemaining is typically 10 seconds. Attempts to set values smaller than this are rejected by a badValue response.
4. The item hostTopNGrantedSize typically reports the exact number of hosts that are collected in the hostTopNReport. This means that the value of this item may change after the report has been created.

2.2.4.1. Relationship Between Tables

The following relationship between the host table and the hostTopN table can typically be implemented:

| Change to Host Table | Result in hostTopN control table | Result in hostTopN table |
|---|---|---|
| - valid -> invalid. | - timeRemaining -> 0. | - does not change. |
| - valid -> underCreation. | - status: does not change. | |
| - underCreation -> invalid. | - No change. | - No change. |

| Change to HostTopN control Table | | Result in hostTopN table |
|---|---|---|
| - valid -> underCreation. | | - Relevant entries deleted. |
| - any status -> invalid. | | - Relevant entries deleted. |

2.2.5. ATM Host Matrix

The ATM Host Matrix is provided by the RMON Matrix group. The probe supports all tables defined in the RMON MIB's matrix group, i.e.:

matrixControlTable matrixSDTable matrixDSTable

In addition, the probe supports the non-RMON amonMatrix SDTable.

Statistics regarding a session are computed as the sum of the traffic on all VCCs between the 2 hosts. The contents of the MIB counters which are typically collected for every session are defined below:

| MIB item | Method of computation | Notes |
|---|---|---|
| matrixPkts | amonMatrixTotalCells | |
| matrixOctets | matrixPkts* 53 | |
| matrixErrors | Always 0 | |

The following implementation specific issues are can typically be utilized:

1. The maximum size of the Matrix table can typically be limited as defined above. Any sessions over this discovered by the probe are not written to the Matrix tables.
2. The datasource of the matrixControlTable may typically be the following: mib2.interfaces.ifTable.ifEntry.ifIndex.1.
3. When the AMON probe is instructed to start data collection via the matrixControlTable, the SD and DS tables are initialized with entries for all the sessions which are active on the switch at that time.
4. The tables are updated whenever a new session is identified, i.e., when a new VC is created and the 2 hosts communicating on this VC are not already listed in the matrix tables.
5. When an existing session is disconnected for any reason, it is not removed from the RMON Matrix tables, and the counters for this entry remain frozen with their last values. If this session becomes active at a later time, the probe continues counting using the previously frozen counters.

Trigger:

The collection of ATM Matrix Statistics is triggered when a valid is created in the matrixControlTable.

AMON Probe Actions:

When an ATM Matrix collection session begins, the probe performs the following actions:

1. Scans the list of existing VCs, and for each of them creates an entry in the matrixTable.
2. Periodically polls all VCs to update the matrix counters. (Note: this is an implementation issue, and polling of all VCs may be performed in other fashions, e.g., in response to an SNMP get request).
3. When a new VC is created, checks if this session is already in the table, and if not adds it.
4. When an existing VC is deleted, removes this VC from the list of active VCs, but does not remove the session defined by this VC from the RMON tables.

2.2.5.1. Non-RMON MIB Support

The probe supports the non-RMON atmMatrixSDTable. This table is indexed by the same indices as the RMON MatrixSDTable, and is created by the RMON MatrixControlTable. The counters which are typically collected are:

| MIB item | Notes |
|---|---|
| 1. Total Cells | |
| 2. Ubrcells | |
| 3. AbrCells | |
| 4. NonRtVbrCells | |
| 5. RtVbrCells | Will be 0 in V1.3 of the C740. |
| 6. CbrCells | |
| 7. PnniCells | |
| 8. SignalingCells | |
| 9. LaneCells | |

2.2.6. General—Updating Lists in MIB Tables

For all ATM related applications which contain lists of entities (i.e., ATM Port Stats, ATM Host Stats, and ATM Host Matrix) the agent updates the relevant MEB tables when a new entity is discovered—i.e., a new host, session, port or VC. This typically happens in two cases:

When a control entry is activated, all the VCs active on the switch at the time is scanned, and the table is initialized to contain the list of all entities already active on the switch.

When a new VC is created the relevant MIB tables are updated to include any new entities discovered when this happened: hosts—if the VC is used by hosts that are not already in the table, and sessions—if the VC is between two hosts that are not yet communicating with each other via the switch.

When a VC is removed from the switch, the entries pertaining to that VC are typically treated as follows:

1. ATM Hosts are not removed from the RMON and non-RMON host tables,
2. ATM Sessions are not removed from the RMON Matrix tables and the non-RMON tables.

When a port is removed or added to the switch, the port tables are updated to reflect the status of the switch.

2.3. Interfaces to Other Switch Functions

This section describes an interface suitable for the Madge (NAME OF.) Collage 740 ATM switch and commercially available from Madge Networks Ltd., Atidim Technology Park, Building 3, Tel-Aviv 61131, Israel, and is typically different for other commercially available switches.

Figure 8:
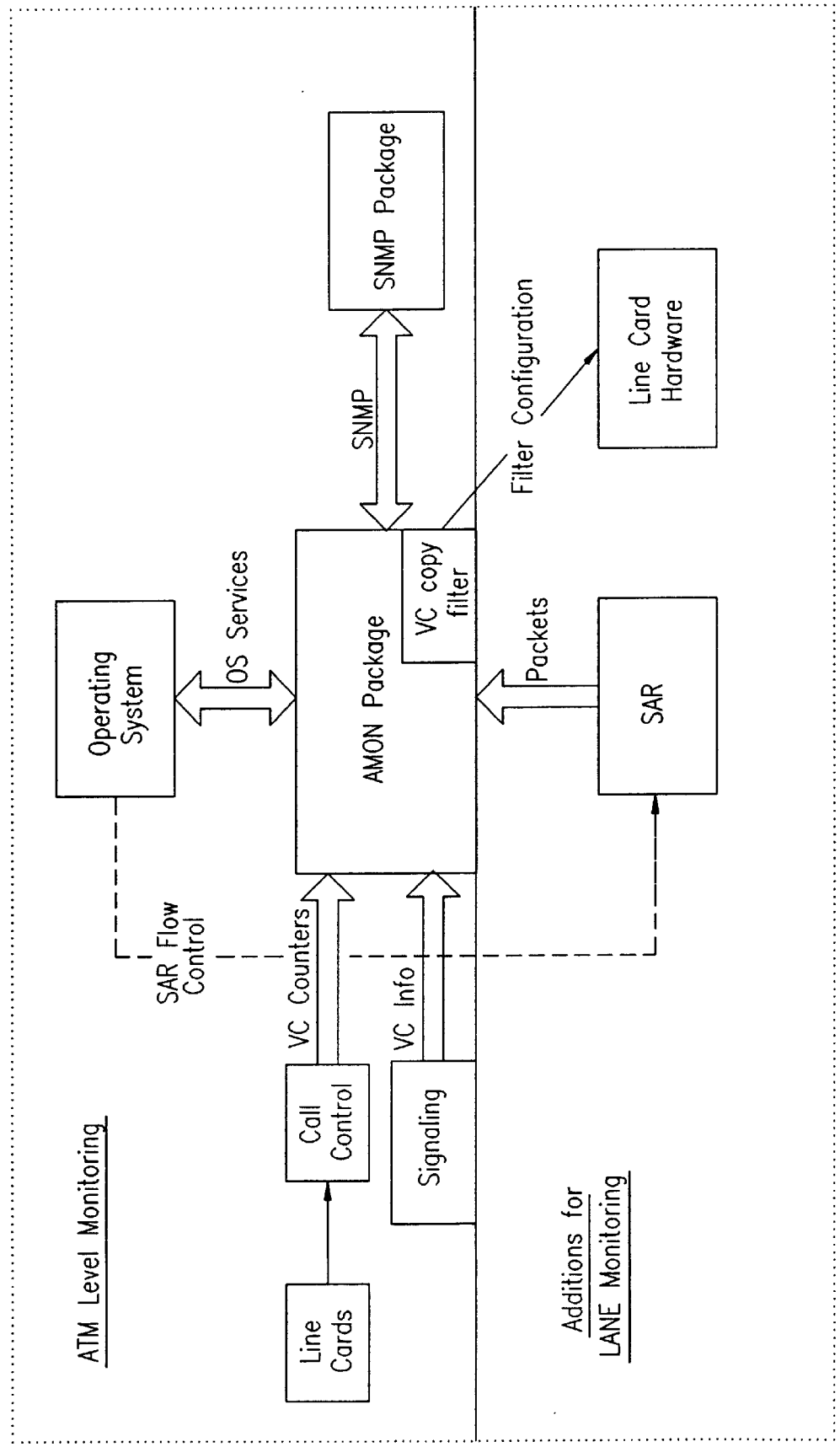
FIG. 8 illustrates a simplified block diagram of the interfaces between AMON and the switch.

The AMON application interfaces with a number of switch functions. A simplified block diagram of a preferred interface between AMON and the switch is illustrated in FIG. 8.

3. Non-RMON MIB

Examples of the information that can be collected by AMON are described by the following MIB:

2.4. ATM Switch Statistics amon OBJECT IDENTIFIER ::= { madge 13 } amonSwitchStats OBJECT IDENTIFIER ::= { amon 1 }

-- Statistics on the overall traffic traversing the ATM switch.
-- This table provides statistics on the traffic traversing the
-- ATM switch. The AMON probe collects these counters at
-- all times.

amonSwitchDropCellEvents OBJECT-TYPE
    SYNTAX Counter
    ACCESS read-only
    STATUS mandatory
    DESCRIPTION
"The total number of events in which the probe could not count cells due to lack of resources.

Note:
1. this number is not related to the number of
cells dropped by the switch itself due to congestion
situations.
2. this number is not necessarily the number of cells
dropped; it is just the number of times this condition has
been detected."
    ::= { amonSwitchStats 1 } amonSwitchDropFrameEvents OBJECT-TYPE
    SYNTAX Counter
    ACCESS read-only
    STATUS mandatory
    DESCRIPTION
"The total number of events in which the probe could not count LAN emulation frames due to lack
of resources.
Note:
1. this number is not related to the number of
frames dropped by the switch itself due to congestion
or early packet drop.
2. this number is not necessarily the number of frames
dropped; it is just the number of times this condition has
been detected."
    ::= { amonSwitchStats 2 } amonSwitchTotalCells OBJECT-TYPE
    SYNTAX Counter
    ACCESS read-only
    STATUS mandatory
    DESCRIPTION
"The total number of ATM cells (including bad HEC cells
and cells dropped by the switch) received by the
switch."
    ::= { amonSwitchStats 3 } amonSwitchBadHecCells OBJECT-TYPE
    SYNTAX Counter
    ACCESS read-only
    STATUS mandatory
    DESCRIPTION
"The total number of bad HEC cells received by the switch."
    ::= { amonSwitchStats 4 } amonSwitchDroppedCells OBJECT-TYPE
    SYNTAX Counter
    ACCESS read-only
    STATUS mandatory DESCRIPTION
"The total number of cells dropped by the switch due to congestion conditions in the switching fabric."
    ::= { amonSwitchStats 5 } amonSwitchUbrCells  OBJECT-TYPE
    SYNTAX  Counter
    ACCESS  read-only
    STATUS  mandatory
    DESCRIPTION
"The total number of good ATM cells transmitted by the switch using the UBR service."
    ::= { amonSwitchStats 6 } amonSwitchAbrCells  OBJECT-TYPE
    SYNTAX  Counter
    ACCESS  read-only
    STATUS  mandatory
    DESCRIPTION
"The total number of good ATM cells transmitted by the switch using the ABR service."
    ::= { amonSwitchStats 7 } amonSwitchNonRtVbrCells  OBJECT-TYPE
    SYNTAX  Counter
    ACCESS  read-only
    STATUS  mandatory
    DESCRIPTION
"The total number of good ATM cells transmitted by the switch using the non real-time VBR service."
    ::= { amonSwitchStats 8 } amonSwitchRtVbrCells  OBJECT-TYPE
    SYNTAX  Counter
    ACCESS  read-only
    STATUS  mandatory
    DESCRIPTION
"The total number of good ATM cells transmitted by the switch using the real-time VBR service."
    ::= { amonSwitchStats 9 } amonSwitchCbrCells  OBJECT-TYPE
    SYNTAX  Counter
    ACCESS  read-only
    STATUS  mandatory
    DESCRIPTION
"The total number of good ATM cells transmitted by the switch using the CBR service."
    ::= { amonSwitchStats 10 } amonSwitchPnniCells  OBJECT-TYPE

```
    SYNTAX Counter
    ACCESS read-only
    STATUS mandatory
    DESCRIPTION
"The total number of good cells transmitted by the switch on PNNI connections."
    ::= { amonSwitchStats 11 } amonSwitchSignalinCells OBJECT-TYPE
    SYNTAX Counter
    ACCESS read-only
    STATUS mandatory
    DESCRIPTION
"The total number of good cells transmitted by the switch on signaling connections."
    ::= { amonSwitchStats 12 } amonSwitchLaneCells OBJECT-TYPE
    SYNTAX Counter
    ACCESS read-only
    STATUS mandatory
    DESCRIPTION
"The total number of good LANE cells switched by the switch."
    ::= { amonSwitchStats 13 } amonSwitchLane802Dot3DataDirectCells OBJECT-TYPE
    SYNTAX Counter
    ACCESS read-only
    STATUS mandatory
    DESCRIPTION
"The total number of good cells transmitted by the switch on LANE 802.3 data direct connections."
    ::= { amonSwitchStats 14 } amonSwitchLane802Dot3MulticastCells OBJECT-TYPE
    SYNTAX Counter
    ACCESS read-only
    STATUS mandatory
    DESCRIPTION
"The total number of good cells transmitted by the switch to LANE 802.3 BUSes."
    ::= { amonSwitchStats 15 } amonSwitchLane802Dot5DataDirectCells OBJECT-TYPE
    SYNTAX Counter
    ACCESS read-only
    STATUS mandatory
    DESCRIPTION
"The total number of good cells transmitted by the switch on LANE 802.5 data direct connections."
    ::= { amonSwitchStats 16 }
```

37

```
amonSwitchLane802Dot5MulticastCells OBJECT-TYPE
    SYNTAX Counter
    ACCESS read-only
    STATUS mandatory
    DESCRIPTION
"The total number of good cells received by the switch from LANE 802.3 BUSes."
    ::= { amonSwitchStats 17 } amonSwitchLaneConfigControlCells OBJECT-TYPE
    SYNTAX Counter
    ACCESS read-only
    STATUS mandatory
    DESCRIPTION
"The total number of good cells transmitted by the switch on LANE configuration and control
connections."
    ::= { amonSwitchStats 18 } amonSwitchTotalBwAllocated OBJECT-TYPE
    SYNTAX Counter
    ACCESS read-only
    STATUS mandatory
    DESCRIPTION
"The total amount of bandwidth allocated by the switch, in Kbps."
    ::= { amonSwitchStats 19 } amonSwitchAbrBwAllocated OBJECT-TYPE
    SYNTAX Counter
    ACCESS read-only
    STATUS mandatory
    DESCRIPTION
"The total amount of bandwidth allocated by the switch for ABR traffic, in Kbps."
    ::= { amonSwitchStats 20 } amonSwitchNonRtVbrBwAllocated OBJECT-TYPE
    SYNTAX Counter
    ACCESS read-only
    STATUS mandatory
    DESCRIPTION
"The total amount of bandwidth allocated by the switch for non real-time VBR traffic, in Kbps."
    ::= { amonSwitchStats 21 } amonSwitchRtVbrBwAllocated OBJECT-TYPE
    SYNTAX Counter
    ACCESS read-only
    STATUS mandatory
    DESCRIPTION
"The total amount of bandwidth allocated by the switch for real time VBR traffic, in Kbps."
```

```
::= { amonSwitchStats 22 } amonSwitchCbrBwAllocated OBJECT-TYPE
    SYNTAX Counter
    ACCESS read-only
    STATUS mandatory
    DESCRIPTION
"The total amount of bandwidth allocated by the switch for CBR traffic, in Kbps."
    ::= { amonSwitchStats 23 }
```

2.5. ATM Port Statistics

```
amonPortStatistics OBJECT IDENTIFIER ::= { amon 2 }

-- Statistics on the traffic traversing each of the switch's
-- physical ports. The AMON probe collects these counters
-- at all times.

amonPortTable OBJECT-TYPE
    SYNTAX SEQUENCE OF AmonPortStatsEntry
    ACCESS not-accessible
    STATUS mandatory
    DESCRIPTION
"A list of port entries. Each entry contains statistical data
pertaining to a single physical port on the ATM switch. An
entry is maintained at all times for each of the ports that exist in the hub. The table is automatically updated for
hot-swappable ports that are added to or removed from
the switch. "
    ::= { amonPortStatistics 1 } amonPortStatsEntry OBJECT-TYPE
    SYNTAX AmonPortStatsEntry
    ACCESS not-accessible
    STATUS mandatory
    DESCRIPTION
"A collection of statistics for a particular port."
    INDEX { amonPortNumber }
    ::= { amonPortTable 1 }

ATMPortStatsEntry::= SEQUENCE {
        atmPortNumber        INTEGER,
        amonPortInCells         Counter,
        amonPortOutCells        Counter,
```

```
        amonPortInBadHecCells       Counter,
        amonPortInUbrCells    Counter,
        amonPortInAbrCells    Counter,
        amonPortInNonRtVbrCells     Counter,
        amonPortInRtVbrCells  Counter,
        amonPortInCbrCells    Counter,
        amonPortInPointToPointCells  Counter,
        amonPortInPointToMultipointCells  Counter,
        amonPortInPnniCells   Counter,
        amonPortInSignalingCells     Counter,
        amonPortInLane802Dot3DataDirectCells Counter,
        amonPortInLane802Dot3MulticastCells Counter,
        amonPortInLane802Dot5DataDirectCells Counter,
        amonPortInLane802Dot5MulticastCells Counter,
        amonPortLaneConfigControlCells Counter,
        amonPortActiveVcs     INTEGER,
        amonPortUbrVcs        INTEGER,
        amonPortAbrVcs        INTEGER,
        amonPortNonRtVbrVcs         INTEGER,
        amonPortRtVbrVcs      INTEGER,
        amonPortCbrVcs        INTEGER,
        amonPortPointToPointVcs  INTEGER,
        amonPortPointToMultipointVcs  INTEGER,
        amonPortPnniVcs       INTEGER,
        amonPortSignalingVcs  INTEGER,
        amonPortLane802Dot3DataDirectVcs    INTEGER,
        amonPortLane802Dot3MulticastVcs     INTEGER,
        amonPortLane802Dot5DataDirectVcs    INTEGER,
        amonPortLane802Dot5MulticastVcs     INTEGER,
        amonPortLane802Dot5ConfigControlVcs INTEGER
            } atmPortNumber OBJECT-TYPE
    SYNTAX INTEGER
    ACCESS read-only
    STATUS mandatory
    DESCRIPTION
"The number of the monitored port. This number will have the value 16(S-1)+P, where S is the slot number and P is the
port number in the slot."
    ::= { amonPortStatsEntry 1 } amonPortInCells OBJECT-TYPE
    SYNTAX Counter
    ACCESS read-only
    STATUS mandatory
    DESCRIPTION
```

"The number of ATM cells (including bad HEC cells)
received by the switch via this port."
    ::= { amonPortStatsEntry 2 } amonPortOutCells OBJECT-TYPE
    SYNTAX Counter
    ACCESS read-only
    STATUS mandatory
    DESCRIPTION
"The number of ATM cells (including bad HEC cells)
transmitted by the switch via this port."
    ::= { amonPortStatsEntry 3 } amonPortInBadHecCells OBJECT-TYPE
    SYNTAX Counter
    ACCESS read-only
    STATUS mandatory
    DESCRIPTION
"The number of bad HEC cells received by the switch through this port."
    ::= { amonPortStatsEntry 4 } amonPortInUbrCells OBJECT-TYPE
    SYNTAX Counter
    ACCESS read-only
    STATUS mandatory
    DESCRIPTION
"The number of good ATM cells received by the
switch via this port using the UBR service."
    ::= { amonPortStatsEntry 5 } amonPortInAbrCells OBJECT-TYPE
    SYNTAX Counter
    ACCESS read-only
    STATUS mandatory
    DESCRIPTION
"The number of good ATM cells received by the
switch via this port using the ABR service."
    ::= { amonPortStatsEntry 6 } amonPortInNonRtVbrCells OBJECT-TYPE
    SYNTAX Counter
    ACCESS read-only
    STATUS mandatory
    DESCRIPTION
"The number of good ATM cells received by the
switch via this port using the Non Real-time VBR service."
    ::= { amonPortStatsEntry 7 }

```
amonPortInRtVbrCells OBJECT-TYPE
    SYNTAX Counter
    ACCESS read-only
    STATUS mandatory
    DESCRIPTION
"The number of good ATM cells received by the
switch via this port using the real-time VBR service."
    ::= { amonPortStatsEntry 8 } amonPortInCbrCells OBJECT-TYPE
    SYNTAX Counter
    ACCESS read-only
    STATUS mandatory
    DESCRIPTION
"The number of good ATM cells received by the
switch via this port using the CBR service."
    ::= { amonPortStatsEntry 9 } amonPortInPointToPointCells OBJECT-TYPE
    SYNTAX Counter
    ACCESS read-only
    STATUS mandatory
    DESCRIPTION
"The number of good ATM cells received by the
switch via this port on point to point connections."
    ::= { amonPortStatsEntry 10 } amonPortInPointToMultipointCells OBJECT-TYPE
    SYNTAX Counter
    ACCESS read-only
    STATUS mandatory
    DESCRIPTION
"The number of good ATM cells received by the
switch via this port on point to point connections."
    ::= { amonPortStatsEntry 11 } amonPortInPnniCells OBJECT-TYPE
    SYNTAX Counter
    ACCESS read-only
    STATUS mandatory
    DESCRIPTION
"The number of good cells received by the switch via this port on connections used for PNNI."
    ::= { amonPortStatsEntry 12 } amonPortInSignalingCells OBJECT-TYPE
    SYNTAX Counter
```

```
    ACCESS read-only
    STATUS mandatory
    DESCRIPTION
"The number of good cells received by the switch via this port on connections used for signaling."
    ::= { amonPortStatsEntry 13 } amonPortInLane802Dot3DataDirectCells  OBJECT-TYPE
    SYNTAX Counter
    ACCESS read-only
    STATUS mandatory
    DESCRIPTION
"The number of good cells received by the switch via this port on LANE 802.3 data direct
connections."
    ::= { amonPortStatsEntry 14 } amonPortInLane802Dot3MulticastCells  OBJECT-TYPE
    SYNTAX Counter
    ACCESS read-only
    STATUS mandatory
    DESCRIPTION
"The number of good cells received by the switch via this port on LANE 802.3 multicast
connections."
    ::= { amonPortStatsEntry 15 } amonPortInLane802Dot5DataDirectCells  OBJECT-TYPE
    SYNTAX Counter
    ACCESS read-only
    STATUS mandatory
    DESCRIPTION
"The number of good cells received by the switch via this port on LANE 802.5 data direct
connections."
    ::= { amonPortStatsEntry 16 } amonPortInLane802Dot5MulticastCells  OBJECT-TYPE
    SYNTAX Counter
    ACCESS read-only
    STATUS mandatory
    DESCRIPTION
"The number of good cells received by the switch via this port on LANE 802.5 multicast
connections."
    ::= { amonPortStatsEntry 17 } amonPortLaneConfigControlCells  OBJECT-TYPE
    SYNTAX Counter
    ACCESS read-only
    STATUS mandatory
    DESCRIPTION
```

"The number of good cells received by the switch via this port on LANE configuration and control connections."
::= { amonPortStatsEntry 18 } amonPortActiveVcs OBJECT-TYPE
   SYNTAX INTEGER
   ACCESS read-only
   STATUS mandatory
   DESCRIPTION
"The number of virtual channels currently active on this port."
   ::= { amonPortStatsEntry 19 } amonPortUbrVcs OBJECT-TYPE
   SYNTAX INTEGER
   ACCESS read-only
   STATUS mandatory
   DESCRIPTION
"The number of virtual channels currently active on this port that use UBR service."
   ::= { amonPortStatsEntry 20} amonPortAbrVcs OBJECT-TYPE
   SYNTAX INTEGER
   ACCESS read-only
   STATUS mandatory
   DESCRIPTION
"The number of virtual channels currently active on this port that use ABR service."
   ::= { amonPortStatsEntry 21 } amonPortNonRtVbrVcs OBJECT-TYPE
   SYNTAX INTEGER
   ACCESS read-only
   STATUS mandatory
   DESCRIPTION
" The number of virtual channels currently active on this port that use the non real-time VBR service."
   ::= { amonPortStatsEntry 22 } amonPortRtVbrVcs OBJECT-TYPE
   SYNTAX INTEGER
   ACCESS read-only
   STATUS mandatory
   DESCRIPTION
" The number of virtual channels currently active on this port that use the real-time VBR service."

```
    ::= { amonPortStatsEntry 23 } amonPortCbrVcs  OBJECT-TYPE
    SYNTAX INTEGER
    ACCESS read-only
    STATUS mandatory
    DESCRIPTION
" The number of virtual channels currently active on this
port that use CBR service."
    ::= { amonPortStatsEntry 24 } amonPortPointToPointVcs  OBJECT-TYPE
    SYNTAX INTEGER
    ACCESS read-only
    STATUS mandatory
    DESCRIPTION
"The number of point-to-point virtual channels connected to this port."
    ::= { amonPortStatsEntry 25 } amonPortPointToMultipointVcs  OBJECT-TYPE
    SYNTAX INTEGER
    ACCESS read-only
    STATUS mandatory
    DESCRIPTION
"The number of point-to-multipoint virtual channels
connected to this port - either roots or leafs."
    ::= { amonPortStatsEntry 26 } amonPortPnniVcs  OBJECT-TYPE
    SYNTAX INTEGER
    ACCESS read-only
    STATUS mandatory
    DESCRIPTION
"The number of virtual channels connected to the port used for PNNI traffic."
    ::= { amonPortStatsEntry 27 } amonPortSignalingVcs  OBJECT-TYPE
    SYNTAX INTEGER
    ACCESS read-only
    STATUS mandatory
    DESCRIPTION
"The number of virtual channels connected to the port used for Signaling traffic."
    ::= { amonPortStatsEntry 28 } amonPortLane802Dot3DataDirectVcs  OBJECT-TYPE
    SYNTAX INTEGER
    ACCESS read-only
```

```
      STATUS mandatory
      DESCRIPTION
  "The number of 802.3 LANE Data Direct virtual channels
  connected to the port."
      ::= { amonPortStatsEntry 29 } amonPortLane802Dot3MulticastVcs OBJECT-TYPE
      SYNTAX INTEGER
      ACCESS read-only
      STATUS mandatory
      DESCRIPTION
  "The number of 802.3 LANE multicast virtual channels
  connected to the port."
      ::= { amonPortStatsEntry 30 } amonPortLane802Dot5DataDirectVcs OBJECT-TYPE
      SYNTAX INTEGER
      ACCESS read-only
      STATUS mandatory
      DESCRIPTION
  "The number of 802.5 LANE Data Direct virtual channels
  connected to the port."
      ::= { amonPortStatsEntry 31 } amonPortLane802Dot5MulticastVcs OBJECT-TYPE
      SYNTAX INTEGER
      ACCESS read-only
      STATUS mandatory
      DESCRIPTION
  "The number of 802.5 LANE multicast virtual channels
  connected to the port."
      ::= { amonPortStatsEntry 32 } amonPortLane802Dot5ConfigControlVcs OBJECT-TYPE
      SYNTAX INTEGER
      ACCESS read-only
      STATUS mandatory
      DESCRIPTION
  "The number of 802.5 LANE Configuration and Control
  virtual channels connected to the port."
      ::= { amonPortStatsEntry 33 } amonPortList OBJECT-TYPE
      SYNTAX OCTET STRING (SIZE (16))
      ACCESS read-only
      STATUS mandatory
```

DESCRIPTION
" A list of all ports in the switch. 16 bits in the map are
allocated for each slot in the hub. The MSB is for port 1
of slot 1, and the LSB is for port 16 of slot 16. For ports
which are in the hub the value of the bit is 1, otherwise 0.
Note that the C-740 has only 5 slots, so for this switch
some of the bits are redundant.
With this logic, the bit that represents port P in slot S
is bit number (S-1)*16+P."
    ::= { amonPortStatistics 2 }

2.6. ATM Host Statistics amonHostStatistics OBJECT IDENTIFIER ::= {amon 3}

-- Statistics on traffic transmitted and received by the ATM
-- stations communicating via the switch. The AMON probe
-- collects these counters upon request from the RMON
-- MIB.

amonHostTimeTable OBJECT-TYPE
    SYNTAX SEQUENCE OF AmonHostEntry
    ACCESS not-accessible
    STATUS mandatory
    DESCRIPTION
"A list of ATM host time entries. Each entry contains
statistical data pertaining to a single ATM host
communicating via the switch. The table is activated by the
RMON hostControlTable. The table is indexed by the
RMON MIB's hostTimeIndex and hostTimeCreationOrder.
    ::= { amonHostStatistics 1 } amonHostEntry OBJECT-TYPE
    SYNTAX AmonHostEntry
    ACCESS not-accessible
    STATUS mandatory
    DESCRIPTION
"A collection of statistics for a particular ATM host."
    INDEX { hostTimeIndex, hostTimeCreationOrder }
    ::= { amonHostTimeTable 1 }

AmonHostTimeEntry::= SEQUENCE {
        amonHostTimeAddress  OCTET STRING,
        amonHostTimeCreationOrder  INTEGER,
        amonHostTimeIndex     INTEGER,
        amonHostTimeInCells   Counter,

```
            amonHostTimeOutCells         Counter,
            amonHostTimeOutUbrCells      Counter,
            amonHostTimeOutAbrCells      Counter,
            amonHostTimeOutNonRtVbrCells        Counter,
            amonHostTimeOutRtVbrCells    Counter,
            amonHostTimeOutCbrCells      Counter,
            amonHostTimeInLaneCells      Counter,
            amonHostTimeOutLaneCells  Counter,
            amonHostTimeOutLane802Dot3DataDirectCells  Counter,
            amonHostTimeOutLane802Dot3MulticastCells Counter,
            amonHostTimeOutLane802Dot5DataDirectCells  Counter,
            amonHostTimeOutLane802Dot5MulticastCells Counter,
            amonHostTimeOutLaneConfigControlCells Counter,
            amonHostTimeActiveVcs        INTEGER,
            amonHostTimeUbrVcs  INTEGER,
            amonHostTimeAbrVcs  INTEGER,
            amonHostTimeNonRtAbrVcs      INTEGER,
            amonHostTimeRtVbrVcs         INTEGER,
            amonHostTimeCbrVcs  INTEGER,
            amonHostTimeInPointToMultipointVcs  INTEGER,
            amonHostTimeOutPointToMultipointVcs  INTEGER,
            amonHostTimeLane802Dot3DataDirectVcs  INTEGER,
            amonHostTimeLane802Dot3MulticastVcs  INTEGER,
            amonHostTimeLane802Dot5DataDirectVcs  INTEGER,
            amonHostTimeLane802Dot5MulticastVcs  INTEGER,
            amonHostTimeLaneConfigControlVcs  INTEGER
                    } amonHostTimeAddress OBJECT-TYPE
    SYNTAX OCTET STRING
    ACCESS read-only
    STATUS mandatory
    DESCRIPTION
"The ATM address of this host."
    ::= { amonHostTimeEntry 1 } amonHostTimeCreationOrder OBJECT-TYPE
    SYNTAX INTEGER (1..65535)
    ACCESS read-only
    STATUS mandatory
    DESCRIPTION
"An index that uniquely identifies an entry in
the atmhostTime table among those entries
associated with the same hostControlEntry. This
index shall be between 1 and N, where N is the
value of the associated hostControlTableSize.
The ordering of the indexes is based on the order
``` of each entry's insertion into the table, in which
entries added earlier have a lower index value
than entries added later. Thus the management
station has the ability to learn of new entries
added to this table without downloading the
entire table."
   ::= { amonHostTimeEntry 2 } amonHostTimeIndex OBJECT-TYPE
   SYNTAX INTEGER (1..65535)
   ACCESS read-only
   STATUS mandatory
   DESCRIPTION
"The set of collected host statistics of which this entry is a
part. The set of hosts which identified by a particular value of this index is associated with the
hostControlEntry as identified by the same value of hostControlIndex."
   ::= { amonHostTimeEntry 3 } amonHostTimeInCells OBJECT-TYPE
   SYNTAX Counter
   ACCESS read-only
   STATUS mandatory
   DESCRIPTION
"The number of ATM cells (including bad HEC cells)
transmitted via the switch to this host."
   ::= { amonHostTimeEntry 4 } amonHostTimeOutCells OBJECT-TYPE
   SYNTAX Counter
   ACCESS read-only
   STATUS mandatory
   DESCRIPTION
"The number of ATM cells (including bad HEC cells)
transmitted by this host via the switch."
   ::= { amonHostTimeEntry 5 } amonHostTimeOutUbrCells OBJECT-TYPE
   SYNTAX Counter
   ACCESS read-only
   STATUS mandatory
   DESCRIPTION
"The number of good ATM cells transmitted by the
host via the switch using the UBR service."
   ::= { amonHostTimeEntry 6 } amonHostTimeOutAbrCells OBJECT-TYPE
   SYNTAX Counter

```
    ACCESS read-only
    STATUS mandatory
    DESCRIPTION
"The number of good ATM cells transmitted by the
host via the switch using the ABR service."
    ::= { amonHostTimeEntry 7 } amonHostTimeOutNonRtVbrCells  OBJECT-TYPE
    SYNTAX Counter
    ACCESS read-only
    STATUS mandatory
    DESCRIPTION
"The number of good ATM cells transmitted by the
host via the switch using the Non real time VBR service."
    ::= { amonHostTimeEntry 8 } amonHostTimeOutRtVbrCells  OBJECT-TYPE
    SYNTAX Counter
    ACCESS read-only
    STATUS mandatory
    DESCRIPTION
"The number of good ATM cells transmitted by the
host via the switch using the real time VBR service."
    ::= { amonHostTimeEntry 8 } amonHostTimeOutCbrCells  OBJECT-TYPE
    SYNTAX Counter
    ACCESS read-only
    STATUS mandatory
    DESCRIPTION
"The number of good ATM cells transmitted by the
host via the switch using the CBR service."
    ::= { amonHostTimeEntry 9 } amonHostTimeInLaneCells  OBJECT-TYPE
    SYNTAX Counter
    ACCESS read-only
    STATUS mandatory
    DESCRIPTION
"The total number of good LANE cells received by
this host on VCs handled by the switch."
    ::= { amonHostTimeEntry 10 } amonHostTimeOutLaneCells  OBJECT-TYPE
    SYNTAX Counter
    ACCESS read-only
    STATUS mandatory
```

DESCRIPTION
"The total number of good LANE cells transmitted by this host on VCs handled by the switch."
    ::= { amonHostTimeEntry 11 } amonHostTimeOutLane802Dot3DataDirectCells OBJECT-TYPE
    SYNTAX Counter
    ACCESS read-only
    STATUS mandatory
    DESCRIPTION
"The number of good cells transmitted by this host on LANE 802.3 data direct VCs are handled by the switch."
    ::= { amonHostTimeEntry 12 } amonHostTimeOutLane802Dot3MulticastCells OBJECT-TYPE
    SYNTAX Counter
    ACCESS read-only
    STATUS mandatory
    DESCRIPTION
"The number of good cells transmitted by this host on LANE 802.3 multicast VCs are handled by the switch."
    ::= { amonHostTimeEntry 13 } amonHostTimeOutLane802Dot5DataDirectCells OBJECT-TYPE
    SYNTAX Counter
    ACCESS read-only
    STATUS mandatory
    DESCRIPTION
"The number of good cells transmitted by this host on LANE 802.5 data direct VCs are handled by the switch."
    ::= { amonHostTimeEntry 14 } amonHostTimeOutLane802Dot5MulticastCells OBJECT-TYPE
    SYNTAX Counter
    ACCESS read-only
    STATUS mandatory
    DESCRIPTION
"The number of good cells transmitted by this host on LANE 802.5 multicast VCs handled by the switch."
    ::= { amonHostTimeEntry 15 } amonHostTimeOutLaneConfigControlCells OBJECT-TYPE
    SYNTAX Counter
    ACCESS read-only
    STATUS mandatory
    DESCRIPTION
"The number of good cells transmitted by this host on LANE configuration and control VCs are handled by the switch."
    ::= { amonHostTimeEntry 16 } amonHostTimeActiveVcs OBJECT-TYPE
    SYNTAX INTEGER
    ACCESS read-only
    STATUS mandatory
    DESCRIPTION
"The number of virtual channels currently connected to this host."
    ::= { amonHostTimeEntry 17 } amonHostTimeUbrVcs OBJECT-TYPE
    SYNTAX INTEGER
    ACCESS read-only
    STATUS mandatory
    DESCRIPTION
"The number of virtual channels currently connected to this host that use UBR service."
    ::= { amonHostTimeEntry 18 } amonHostTimeAbrVcs OBJECT-TYPE
    SYNTAX INTEGER
    ACCESS read-only
    STATUS mandatory
    DESCRIPTION
"The number of virtual channels currently connected to this host that use ABR service."
    ::= { amonHostTimeEntry 19 } amonHostTimeNonRtVbrVcs OBJECT-TYPE
    SYNTAX INTEGER
    ACCESS read-only
    STATUS mandatory
    DESCRIPTION
" The number of virtual channels currently connected to this host that use the non real-time VBR service."
    ::= { amonHostTimeEntry 20 } amonHostTimeRtVbrVcs OBJECT-TYPE
    SYNTAX INTEGER
    ACCESS read-only
    STATUS mandatory
    DESCRIPTION
" The number of virtual channels currently connected to this host that use the real-time VBR service."
    ::= { amonHostTimeEntry 21 } amonHostTimeCbrVcs OBJECT-TYPE
    SYNTAX INTEGER
    ACCESS read-only

STATUS mandatory
DESCRIPTION
" The number of virtual channels currently connected to this host that use CBR service."
   ::= { amonHostTimeEntry 22 } amonHostTimeInPointToMultipointVcs  OBJECT-TYPE
   SYNTAX  INTEGER
   ACCESS read-only
   STATUS mandatory
   DESCRIPTION
"The number of point-to-Multipoint virtual channels
to which this ATM host is connected as a leaf."
   ::= { amonHostTimeEntry 23 } amonHostTimeOutPointToMultipointVcs  OBJECT-TYPE
   SYNTAX  INTEGER
   ACCESS read-only
   STATUS mandatory
   DESCRIPTION
"The number of point-to-Multipoint virtual channels
to which this ATM host is connected as the root."
   ::= { amonHostTimeEntry 24 } amonHostTimeLane802Dot3DataDirectVcs  OBJECT-TYPE
   SYNTAX  INTEGER
   ACCESS read-only
   STATUS mandatory
   DESCRIPTION
"The number of 802.3 LANE Data Direct virtual channels
connected to the host."
   ::= { amonHostTimeEntry 25 } amonHostTimeLane802Dot3MulticastVcs  OBJECT-TYPE
   SYNTAX  INTEGER
   ACCESS read-only
   STATUS mandatory
   DESCRIPTION
"The number of 802.3 LANE multicast virtual channels
connected to the host."
   ::= { amonHostTimeEntry 26 } amonHostTimeLane802Dot5DataDirectVcs  OBJECT-TYPE
   SYNTAX  INTEGER
   ACCESS read-only
   STATUS mandatory
   DESCRIPTION
"The number of 802.5 LANE Data Direct virtual channels connected to the host."
    ::= { amonHostTimeEntry 27 } amonHostTimeLane802Dot5MulticastVcs OBJECT-TYPE
    SYNTAX INTEGER
    ACCESS read-only
    STATUS mandatory
    DESCRIPTION
"The number of 802.5 LANE multicast virtual channels
connected to the host."
    ::= { amonHostTimeEntry 28 } amonHostTimeLaneConfigControlVcs OBJECT-TYPE
    SYNTAX INTEGER
    ACCESS read-only
    STATUS mandatory
    DESCRIPTION
"The number of 802.5 LANE Configuration and Control
virtual channels connected to the host."
    ::= { amonHostTimeEntry 29 }

2.7. The ATM Host Matrix amonHostMatrix OBJECT IDENTIFIER ::= {amon 4} matrixSDTable OBJECT-TYPE
    SYNTAX SEQUENCE OF MatrixSDEntry
    ACCESS not-accessible
    STATUS mandatory
    DESCRIPTION
"A list of traffic ATM matrix entries indexed by
source and destination ATM NSAP address."
    ::= { amonHostMatrix 1 } matrixSDEntry OBJECT-TYPE
    SYNTAX MatrixSDEntry
    ACCESS not-accessible
    STATUS mandatory
    DESCRIPTION
"A collection of statistics for communications between
two ATM NSAP addresses on the switch. This table is
created by the RMON MIB matrix control table."
** INDEX { amonMatrixSDIndex, amonMatrixSDSourceAddress, amonMatrixSDDestAddress }
    ::= { matrixSDTable 1 }

AmonMatrixSDEntry ::= SEQUENCE

54

```
{
amonMatrixSDSourceAddress      OCTET STRING,
amonMatrixSDDestAddress OCTET STRING,
amonMatrixSDIndex       INTEGER (1..65535),
amonMatrixSDCells             Counter,
amonMatrixSDUbrCells    Counter,
amonMatrixSDAbrCells    Counter,
amonMatrixSDNonRtVbrCells       Counter,
amonMatrixSDRtVbrCells  Counter,
amonMatrixSDCbrCells    Counter
}
``` amonMatrixSDSourceAddress OBJECT-TYPE
SYNTAX OCTET STRING (20)
ACCESS read-only
STATUS mandatory
DESCRIPTION
" The source ATM NSAP address."
::= { amonMatrixSDEntry 1} amonMatrixSDDestAddress OBJECT-TYPE
SYNTAX OCTET STRING (20)
ACCESS read-only
STATUS mandatory
DESCRIPTION
" The destination ATM NSAP address."
::= { amonMatrixSDEntry 2} amonMatrixSDIndex OBJECT-TYPE
SYNTAX OCTET STRING
ACCESS read-only
STATUS mandatory
DESCRIPTION
" The set of collected matrix statistics of which
this entry is a part. The set of matrix statistics
identified by a particular value of this index
is associated with the same matrixControlEntry
as identified by the same value of matrixControlIndex."
::= { amonMatrixSDEntry 3} amonMatrixSDCells OBJECT-TYPE
SYNTAX OCTET STRING
ACCESS read-only
STATUS mandatory
DESCRIPTION
" The number of cells transmitted from the source
address to the destination address."

```
::= { amonMatrixSDEntry 4}
``` amonMatrixSDUbrCells   OBJECT-TYPE
   SYNTAX OCTET STRING
   ACCESS read-only
   STATUS mandatory
   DESCRIPTION
   " The number of cells transmitted from the source
   address to the destination address via the switch
   using the UBR service."
   ::= { amonMatrixSDEntry 5} amonMatrixSDAbrCells   OBJECT-TYPE
   SYNTAX OCTET STRING
   ACCESS read-only
   STATUS mandatory
   DESCRIPTION
   " The number of cells transmitted from the source
   address to the destination address via the switch
   using the ABR service."
   ::= { amonMatrixSDEntry 6} amonMatrixSDNonRtVbrCells   OBJECT-TYPE
   SYNTAX OCTET STRING
   ACCESS read-only
   STATUS mandatory
   DESCRIPTION
   " The number of cells transmitted from the source
   address to the destination address via the switch
   using the Non Real-Time VBR service."
   ::= { amonMatrixSDEntry 7} amonMatrixSDRtVbrCells   OBJECT-TYPE
   SYNTAX OCTET STRING
   ACCESS read-only
   STATUS mandatory
   DESCRIPTION
   " The number of cells transmitted from the source
   address to the destination address via the switch
   using the Real-Time VBR service."
   ::= { amonMatrixSDEntry 8} amonMatrixSDCbrCells OBJECT-TYPE
   SYNTAX OCTET STRING
   ACCESS read-only
   STATUS mandatory
   DESCRIPTION " The number of cells transmitted from the source
address to the destination address via the switch
using the CBR service."
    ::= { amonMatrixSDEntry 9}

2.8. The ATM Session Filter amonFilters OBJECT IDENTIFIER ::= {amon 5}

-- Definition of Filters for analysis of subsets of ATM traffic.

amonSessionFilterTable OBJECT-TYPE
    SYNTAX SEQUENCE OF AmonSessionFilterEntry
    ACCESS not-accessible
    STATUS mandatory
    DESCRIPTION
"A list of ATM sessions to be monitored by the
ATM monitoring probe."
    ::= { amonFilters 1 } amonSessionFilterEntry OBJECT-TYPE
    SYNTAX AmonSessionFilterEntry
    ACCESS not-accessible
    STATUS mandatory
    DESCRIPTION
"An entry in the ATM session filter table."
    INDEX { amonSessionFilterIndex }
    ::= { amonSessionFilterTable 1 }

AmonSessionFilterEntry ::= SEQUENCE
    {
    amonSessionFilterIndex          INTEGER,
    amonSessionFilterAddressOne     OCTET STRING,
    amonSessionFilterAddressTwo     OCTET STRING,
    amonSessionFilterLanProtocol    INTEGER,
    amonSessionFilterSessionType    INTEGER,
    amonSessionFilterFlushMessages  Counter
    } amonSessionFilterIndex INTEGER
    SYNTAX INTEGER
    ACCESS read-only
    STATUS mandatory
    DESCRIPTION
"The index of this session filter. The OID of this item is a
legitimate DataSource for the RMON MIB's tables. "

```
    ::= { amonSessionFilterEntry 1 } amonSessionFilterAddressOne OBJECT-TYPE
    SYNTAX OCTET STRING
    ACCESS read-write
    STATUS mandatory
    DESCRIPTION
"The 20 byte ATM address defining one side of the session
to be monitored. Together with the address defined in
tbdAtmSessionFilterAddressTwo, this address defines an
ATM session to be monitored by the ATM monitoring
probe. "
    ::= { amonSessionFilterEntry 2 } amonSessionFilterAddressTwo OBJECT-TYPE
    SYNTAX OCTET STRING
    ACCESS read-write
    STATUS mandatory
    DESCRIPTION
"The 20 byte ATM address defining the second side of the
session to be monitored. Together with the address defined
in amonSessionFilterAddressOne, this address defines an
ATM session to be monitored by the ATM monitoring
probe."
    ::= { amonSessionFilterEntry 3 } amonSessionFilterLanProtocol    SYNTAX INTEGER
                {
                802Dot3(3)
                802Dot5(5)
                Unknown(255)
                }
    ACCESS read-only
    STATUS mandatory
    DESCRIPTION
"The LAN protocol used on this LANE session. The value
of this item is changed from Unknown(255) to some other
value when the status of an RMON control entry which uses
this filter as its DataSource is set to 'valid'. This item can
report either 802.3 or 802.5 LANE. If the protocol is
unknown or the session is not identified as a LANE session,
the probe reports the value 255."
    ::= { amonSessionFilterEntry 4 } amonSessionFilterSessionType   SYNTAX INTEGER
                {
                NonLane(1)
```

```
        UnidentifiedLANE(2)
        LecToLec(3)
        LecToBus(4)
        BusToLec(5)
        Unknown(255)
        }
    ACCESS read-only
    STATUS mandatory
    DESCRIPTION
"The type of LANE session monitored by the probe. The value of this
item
is changed from Unknown(255) to some other value when the status of an
RMON control entry which uses this filter as its DataSource is set to
'valid'. This item can report either LEC to LEC sessions or LEC to
BUS sessions.
If the session type is not identified as a LANE session, the
probe reports the value 1. If the defined session is a LANE
session the value of this item will be one of the values 2,3,4,
or 5, where LecToBus and BusToLec relate to the two
addresses defined in amonSessionFilterAddressOne and
amonSessionFilterAddressTwo."
    ::= {amonSessionFilterEntry 5}
amonSessionFilterTableClear OBJECT-TYPE
    SYNTAX INTEGER {
        idle(1),
        clear(2)
        }
    ACCESS read-write
    STATUS mandatory
    DESCRIPTION
"Setting the value of this item to clear(2) causes the
agent to clear all entries in the amonSessionFilterTable."
    ::= {amonFilters 2}
```

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

The invention claimed is:

1. A method for analyzing traffic on an ATM network, the network comprising a first plurality of stations to be interconnected by a second plurality of ATM connections, the method comprising:

intercepting at least one ATM connection characteristic of at least two of said second plurality of ATM connections and storing said at least one ATM connection characteristic in an ATM connection characteristic memory;

monitoring an amount of traffic passing over said at least two of said second plurality of ATM connections and accumnulating said amounts of traffic in said ATM connection characteristic memory;

for at least one ATM connection subset including said at least two of said second plurality of ATM connections which comply with a retrieval key, the retrieval key comprising a combination of at least one of said ATM connection characteristics, determining a total amount of traffic that has passed over said ATM connection subset by retrieving from said memory, using said retrieval key, the amounts of traffic passing over each ATM connection in said ATM connection subset and summing said amounts; and generating an output representation of said total amount of traffic.

2. A method according to claim 1 wherein said at least one ATM connection characteristic comprises an identity of at least one of the stations interconnected by an individual ATM connection.

3. A method according to claim 1 wherein at least one of said ATM connections comprises a LAN-emulation ATM connections and said at least one ATM connection characteristic comprises a LAN-emulation protocol ID.

4. A method according to claim 1 wherein said at least one ATM connection characteristic comprises a traffic quality service type of an ATM connection.

5. A method according to claim 1 wherein said at least one ATM connection characteristic comprises a function which an ATM connection serves.

6. A method for analyzing performance of an ATM network, the network comprising a first plurality of stations to be interconnected by a second plurality of ATM connections, the method comprising:

intercepting at least one ATM connection characteristic of at least two of said second plurality of ATM connections and storing said at least one ATM connection characteristic in an ATM connection characteristic memory;

monitoring at least one operation parameter of said at least two of said second plurality of ATM connections and storing said operation parameters in said ATM connection characteristic memory;

for at least one ATM connection subset including said at least two of said second plurality of ATM connections which comply with a retrieval key, the retrieval key comprising a combination of at least one of said ATM connection characteristics, retrieving from said memory, using said retrieval key, the operation parameters for each ATM connection in said ATM connection subset and combining said operation parameters into a subset operation characterizing value which characterizes the operation of said subset; and generating an output representation of said subset operation characterizing value.

7. A method according to claim 6 wherein said at least one operation parameter comprises a characterization of errors transmitted over an ATM connection.

8. A method according to claim 1 and wherein said step of generating an output representation comprises generating a computer display.

9. An ATM network apparatus comprising:

a first plurality of network elements including a plurality of stations and at least one switch; and a second plurality of ATM connections, wherein said first plurality of stations is interconnected by said second plurality of ATM connections associated with said at least one switch, and wherein at least one of said first plurality of network elements comprises an operation parameter analysis apparatus, the operation parameter analysis apparatus comprising:

an ATM connection characteristic memory;

an ATM connection characteristic monitor operative, to intercept at least one ATM connection characteristic of at least two of said second plurality of ATM connections and to store said at least one ATM connection characteristic in the ATM connection characteristic memory;

an ATM connection operation parameter monitor operative to monitor at least one operation parameter of each of said at least two of said second plurality of ATM connections and to store said operation parameters in said ATM connection characteristic memory;

an ATM connection operation parameter analyzer operative, for at least one ATM connection subset including said at least two of said second plurality of ATM connections which comply with a retrieval key, the retrieval key comprising a combination of at least one of said ATM connection characteristics, to retrieve from said memory, using said retrieval key, the operation parameters for each ATM connection in said ATM connection subset and to combine said operation parameters into a subset operation characterizing value which characterizes the operation of said subset; and an output apparatus operative to generate an output representation of said subset operation characterizing value.

10. An apparatus according to claim 9 wherein said at least one network element which includes said operation parameter analysis apparatus comprises at least one station.

11. An apparatus according to claim 9 wherein said at least one network element which includes said operation parameter analysis apparatus comprises at least one switch.

12. An apparatus according to claim 9 wherein said at least one network element which includes said operation parameter analysis apparatus comprises a plurality of network elements each including said operation parameter analysis apparatus and also comprising an output value processing unit operative to receive a fifth plurality of subset operation characterizing values from a fifth plurality of ATM connection operation parameter analyzers and to combine said fifth plurality of subset operation characterizing values into a single value.

13. A method according to claim 1 wherein said retrieval key comprises a Boolean combination of a plurality of said ATM connection characteristics.

14. A method according to claim 1 and wherein said step of monitoring the amount of traffic comprises monitoring the traffic passing, in one direction, over at least two of said second plurality of ATM connections.

15. A method according to claim 1 and wherein said step of monitoring the amount of traffic comprises separately monitoring the amount of traffic passing, in each of two directions, over at least two of said second plurality of ATM connections.

16. A method according to claim 1 and wherein at least two of said second plurality of ATM connections comprises a plurality of sub-connections, and wherein said step of monitoring the amount of traffic comprises separately monitoring the amount of traffic passing over each sub-connection of at least two of said second plurality of ATM connections.

17. A method according to claim 16 and wherein said ATM connection characteristics comprise a sub-connection identifier.

18. A method according to claim 17 and wherein said sub-connection identifier comprises a direction associated with said sub-connection.

19. An ATM operation parameter analysis apparatus for use in conjunction with an ATM network, the ATM network comprising a first plurality of network elements including a plurality of stations and at least one switch, and a second plurality of ATM connections, wherein said first plurality of stations is interconnected by sad second plurality of ATM connections associated with at least one switch, the operation parameter analysis apparatus comprising:

an ATM connection characteristic memory;

an ATM connection characteristic monitor operative, to intercept at least one ATM connection characteristic of at least two of said second plurality of ATM connections and to store said at least one ATM connection characteristic in the ATM connection characteristic memory;

an ATM connection operation parameter monitor operative to monitor at least one operation parameter of said at least two of said second plurality of ATM connections and to store said operation parameters in said ATM connection characteristic memory;

an ATM connection operation parameter analyzer operative, for at least one ATM connection subset including said at least two of said second plurality of ATM connections which complies with a retrieval key, the retrieval key comprising a combination of at least one of said ATM connection characteristics, to retrieve from said memory, using said retrieval key, the operation parameters for each ATM connection in said ATM connection subset and to combine said operation parameters into a subset operation characterizing value which characterizes the operation of said subset; and an output apparatus operative to generate an output representation of said subset operation characterizing value.

20. A method according to claim 6 and wherein said step of generating an output representation comprises generating a computer display.

21. A method according to claim 6 and wherein said step of generating an output representation comprises generating an alarm when a threshold value is reached.

22. A method according to claim 6 wherein said retrieval key comprises a Boolean combination of a plurality of said ATM connection characteristics.

23. A method according to claim 1 wherein said intercepting step is preferred during establishment of said second plurality of ATM connections.

24. A method according to claim 4 wherein the traffic service type comprises CBR.

25. A method according to claim 4 wherein the traffic service type comprises RT-VBR.

26. A method according to claim 4 wherein the traffic service type comprises NRT-VBR.

27. A method according to claim 4 wherein the traffic service type comprises VBR.

28. A method according to claim 4 wherein the traffic service type comprises ABR.

29. A method according to claim 5 wherein said function which said ATM connection serves comprises PNNI.

30. A method according to claim 5 wherein said function which said ATM connection serves comprises signaling.

31. A method according to claim 5 wherein said function which said ATM connection serves comprises LAN-emulation.

* * * * *